(12) United States Patent
Kotov et al.

(10) Patent No.: US 10,160,833 B2
(45) Date of Patent: Dec. 25, 2018

(54) SYNTHESIS AND USE OF ARAMID NANOFIBERS

(71) Applicant: THE REGENTS OF THE UNIVERSITY OF MICHIGAN, Ann Arbor, MI (US)

(72) Inventors: Nicholas A. Kotov, Ypsilanti, MI (US); Ming Yang, Ann Arbor, MI (US); Keqin Cao, Ann Arbor, MI (US); Michael D. Thouless, Ann Arbor, MI (US); Ellen M. Arruda, Ann Arbor, MI (US); Anthony M. Waas, Ann Arbor, MI (US); Carlos A. Pons Siepermann, Ann Arbor, MI (US); Ryan M. Anderson, Commerce Township, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 595 days.

(21) Appl. No.: 13/871,106

(22) Filed: Apr. 26, 2013

(65) Prior Publication Data
US 2013/0288050 A1    Oct. 31, 2013

Related U.S. Application Data

(60) Provisional application No. 61/638,991, filed on Apr. 26, 2012.

(51) Int. Cl.
*B32B 5/22* (2006.01)
*C08G 69/32* (2006.01)
(Continued)

(52) U.S. Cl.
CPC ............ *C08G 69/32* (2013.01); *B32B 5/22* (2013.01); *C08L 77/10* (2013.01); *D01F 6/605* (2013.01);
(Continued)

(58) Field of Classification Search
CPC .......... D01F 6/605; C08G 69/32; C08L 77/10; B60B 2360/3418; D02G 3/047; B32B 5/22; C09D 177/10
See application file for complete search history.

(56) References Cited

U.S. PATENT DOCUMENTS 4,552,805 A    11/1985  Fish, Jr.
5,763,652 A *  6/1998  Kawabe ................. C07C 51/02
                                              423/302
(Continued)

FOREIGN PATENT DOCUMENTS

CN    101407995 A  *  4/2009

OTHER PUBLICATIONS

Kevlar 69 product literature dowloaded on Jan. 5, 2016 from http://www.thethreadexchange.com/miva/merchant.mvc?Screen=CTGY&Store_Code=TTE&Category_Code=kevlar_thread_Size_069.*

(Continued)

*Primary Examiner* — Elizabeth A Robinson
(74) *Attorney, Agent, or Firm* — Lempia Summerfield Katz LLC

(57) ABSTRACT

Dissociation of a macroscale version of an aramid fiber leads to the nanofiber form of this polymer. Indefinitely stable dispersions of uniform high-aspect-ratio aramid nanofibers (ANFs) with diameters between 3 and 30 nm controlled by the media composition and up to 10 μm in length are obtained. ANFs can be processed in transparent thin films using layer-by-layer assembly (LBL) with superior mechanical performance.

5 Claims, 11 Drawing Sheets

(51) Int. Cl.
  *C08L 77/10* (2006.01)
  *D06M 13/123* (2006.01)
  *D01F 6/60* (2006.01)
(52) U.S. Cl.
  CPC .......... *D06M 13/123* (2013.01); *Y10T 428/25* (2015.01); *Y10T 428/268* (2015.01); *Y10T 428/269* (2015.01); *Y10T 428/298* (2015.01)

(56) References Cited

U.S. PATENT DOCUMENTS

| | | | | |
|---|---|---|---|---|
| 5,782,248 | A * | 7/1998 | Chang | A45D 29/001 132/200 |
| 5,866,246 | A * | 2/1999 | Schreck | B32B 27/20 428/308.4 |
| 6,942,757 | B1 | 9/2005 | Iwama et al. | |
| 7,624,879 | B2 | 1/2009 | Frances | |
| 7,521,493 | B2 | 4/2009 | Frances | |
| 8,477,480 | B2 | 7/2013 | Hayakawa et al. | |
| 8,512,432 | B2 | 8/2013 | Jones et al. | |
| 2003/0119948 | A1 | 6/2003 | Kelly et al. | |
| 2005/0188831 | A1* | 9/2005 | Squires | F41H 5/20 89/36.02 |
| 2006/0155011 | A1* | 7/2006 | Frances | H01B 1/24 523/220 |
| 2010/0288692 | A1 | 11/2010 | Kakzau | |
| 2011/0281034 | A1* | 11/2011 | Lee | B29C 70/12 427/294 |
| 2013/0280509 | A1 | 10/2013 | Alvarado Chacon et al. | |
| 2015/0354139 | A1 | 12/2015 | Geisen et al. | |

OTHER PUBLICATIONS

Yang et al., Dispersions of Aramid Nanofibers: A New Nanoscale Building Block, Jul. 29, 2011, ACS Nano, 2011 5(9), pp. 6945-6954.*

Srinivasan et al., Structure and Morphology of Small Diameter Electrospun Aramid Fibers, 1995, Polymer International 36 (1995) pp. 195-201.*

Yao et al., Fabrication of Electrospun Meta-aramid Nanofibers in Different Solvent Systems, Fibers and Polymers 2010, vol. 11, No. 7, pp. 1032-1040.*

Karakas, Hale, Electrospinning of Nanofibers and their Applications, 2BFunTex, Jan. 21, 2015.

Luzhansky, Quality Control in Manufacturing of Electrospun Nanofiber Composites, INJ, 2003, 38-42, winter.

Beckman Coulter LS Series Product Manual, Diffraction Sizing, Section 4-2, Oct. 2011.

Cao K. et al., Kevlar-Based Nanocomposites with Hierarchical Structure, Jun. 2012, ECCM15—15th European Conference on Composite Materials; 6 pages.

Cao, Keqin et al., Abstract—Kevlar-based Layer-by-layer Nanocomposite and associated poster, Apr. 2011, Materials Research Society, https://www.mrs.org/technical-programs/programs_abstracts/y10_22_17; 3 pages.

Cao, Keqin et al., Reactive Aramid Nanostructures as High-Performance Polymeric Building Blocks for Advanced Composites, Nov. 20, 2012, Advanced Functional Materials; https://doi.org/10.1002/adfm.201202466; 37 pages.

Cao, Keqin, Design and Synthesis of Reactive Aramid Nanostructures for Advanced Nanocomposites with Tailored Morphology and Properties, 2013, Ph.D. dissertation; University of Michigan (Mechanical Engineering), 180 pages.

Oyen, Michelle L, Modulus and Hardness Relationships, Nov. 12, 2007, iMechanica; http://imechanica.org/node/2285; 6 pages.

Shekkah, Osama, Layer-by-Layer Method for the Synthesis and Growth of Surface Mounted Metal-Organic Frameworks (SURMOFs), Feb. 23, 2010, Institute of Functional Interfaces, Karlsruhe Institute of Technology; Materials 2010; https://doi.org/10.3390/ma3021302; 14 pages.

Villasenor-Ochoa, Humberto, Engineering Fundamentals Refresh: Strength vs Stiffness vs Hardness, Feb. 15, 2017, FICTIV/Hardware Guide; https://www.fictiv.com/hwg/design/engineering-fundamentals-refresh-strength-vs-stiffness-vs-hardness; 12 pages.

Vozar, Steven et al., Automated spin-assisted layer-by-layer assembly of nanocomposites, 2009, Review of Scientific Instruments 80, 023903; https://doi.org/10.1063/1.3078009; 6 pages.

* cited by examiner

SYNTHESIS AND USE OF ARAMID NANOFIBERS

CROSS-REFERENCE TO RELATED APPLICATIONS

This application claims the benefit of U.S. Provisional Application No. 61/638,991, filed on Apr. 26, 2012. The disclosures of the above application is incorporated herein by reference.

GOVERNMENT SUPPORT

This invention was made with government support under N00014-10-0415 awarded by the Office of Naval Research. The government has certain rights in the invention.

BACKGROUND

The structure of nanofibers from polymers is expected to bring about unique mechanical, electrical, and optical properties, which are different from bulk materials similarly to the nanoscale versions of many metals or semiconductors. Polymer nanofibers should be considered as essential "building blocks" of the nanoscale toolset along with a large variety of inorganic "building blocks" well-known in materials science, which include nanoparticles, nanowires, carbon nanotubes (CNTs), graphene, and clay nanosheets. Liquid dispersions of polymer nanofibrils analogous to those obtained for all the other inorganic nanoscale components (INCs) would be most useful for the functional design of nanocomposites and metamaterials. Variable permutations of organic components in the forms of molecular solutions or nanofiber dispersions and INCs will make possible property sets which are currently considered to be difficult or impossible to obtain. However, the choice of polymer nanofiber dispersions is limited at best or not known for most polymers. Compared to dispersions of INCs this is virtually a virgin territory for both chemical and materials research. Polymeric nanofibers are typically produced by electrospinning, drawing, template synthesis, phase separation, and self-assembly. Electrospinning is probably the most widely used method for generating polymeric nanofibers with controlled diameters (from several nanometers to micrometers). This method is very useful for generation of solid nanofiber mats from many different polymers with typical diameters from tens of nanometers to tens of micrometers, but not for very small fibers comparable with CNT diameters or nanofiber dispersions. One can also obtain polymeric nanofibers by template synthesis, for instance in solid oxide matrices followed by their dissolution. This approach can be modified for the preparation of multi-segmented polymer metal nanorods of interest for electronic devices, but it is limited by only a few available templates, relatively large diameters exceeding 50 nm, and is restricted to the interfacial localization of the nanofibers. The yield of the nanorods made from templates is also very small. The small amounts of material that can be produced and the inability to disperse nanofibers in liquid media are also characteristic for many nanofibers made by interfacial reactions. Many examples can be seen for electropolymerized nanofibers of conducting polymers, such as polyaniline nanowires, which typically produce fibrils with diameters of 50-70 nm. There are also techniques for making polymeric nanofibers by phase separation, 6 or interfacial polymerization. They can be convenient for preparation of solid porous materials, but are difficult to use as a general source of nanoscale organic components for materials design. The nanofibers made in this way often exceed 30 nm in diameter. An interesting technique that avoids the interfacial restrictions typical for the methods discussed above is the method of self-assembly of purposely designed organic surfactants. This method can be compared to the assembly of inorganic nanoparticles, and leads to smaller fibers with diameters of less than 10 nm. Some of the self-assembled organic fibers can be made in a dispersed state instead of the more common gels. Although the synthesis of the corresponding surfactants requiring a combination of hydrophilic and hydrophobic blocks is quite complex, these nanofibers are quite interesting for biomedical applications as cell-growth matrices. At the same time, they represent a substantial departure from the idea of polymeric nanofibers with predominantly axial orientation of molecular strands as obtained, for instance, by electrospinning. The radial orientation of the amphiphilic units and small area of interactions between them are not necessarily optimal for mechanical, electrical, and optical properties.

One can see that there are no known examples of dispersions of synthetic polymer nanofibers in size matching those of CNTs, nanowires, nanoparticles, and other INCs. Finding methods for their preparation and utilization of a broader nanotechnology toolbox would be essential for further development of nanomaterials.

SUMMARY

These practical reasons as well as the academic novelty of polymeric nanofiber dispersions in general and the research challenge of making polymeric structures with controlled association with each other prompted us to look for new synthetic approaches to such polymeric materials. As such, in this paper we demonstrate that careful dissociation of a macroscale version of Kevlar leads to the nanofiber form of this polymer. Indefinitely stable dispersions of uniform high-aspect-ratio aramid nanofibers (ANFs) with diameters between 3 and 30 nm controlled by the media composition and up to 10 µm in length were successfully obtained. Their morphologies reveal some similarities with carbon nanotubes and further research is likely to reveal more of such similarities. ANFs can also be processed in transparent thin films using layer-by-layer assembly (LBL) with superior mechanical performance.

Here stable dispersions of uniform high-aspect-ratio aramid nanofibers (ANFs) with diameters between 3 and 30 nm and up to 10 µm in length were successfully obtained. Unlike the traditional approaches based on polymerization of monomers, they are made by controlled dissolution of standard macroscale form of the aramid polymer, that is, well-known Kevlar threads, and revealed distinct morphological features similar to carbon nanotubes. ANFs are successfully processed into films using layer-by-layer (LBL) assembly as one of the potential methods of preparation of composites from ANFs. The resultant films are transparent and highly temperature resilient. They also display enhanced mechanical characteristics making ANF films highly desirable as protective coatings, ultrastrong membranes, as well as building blocks of other high performance materials in place of or in combination with carbon nanotubes.

DRAWINGS

The drawings described herein are for illustration purposes only and are not intended to limit the scope of the present disclosure in any way.

FIGS. 4A.1 and 4B.1 show infrared spectra of aramid with and without treatment. FIGS. 4A.2 and 4B.2 illustrate the model chemical structure of unreacted aramid fiber (A.2) and of hydrolyzed and crosslinked fiber (B.2).

Figure 5:
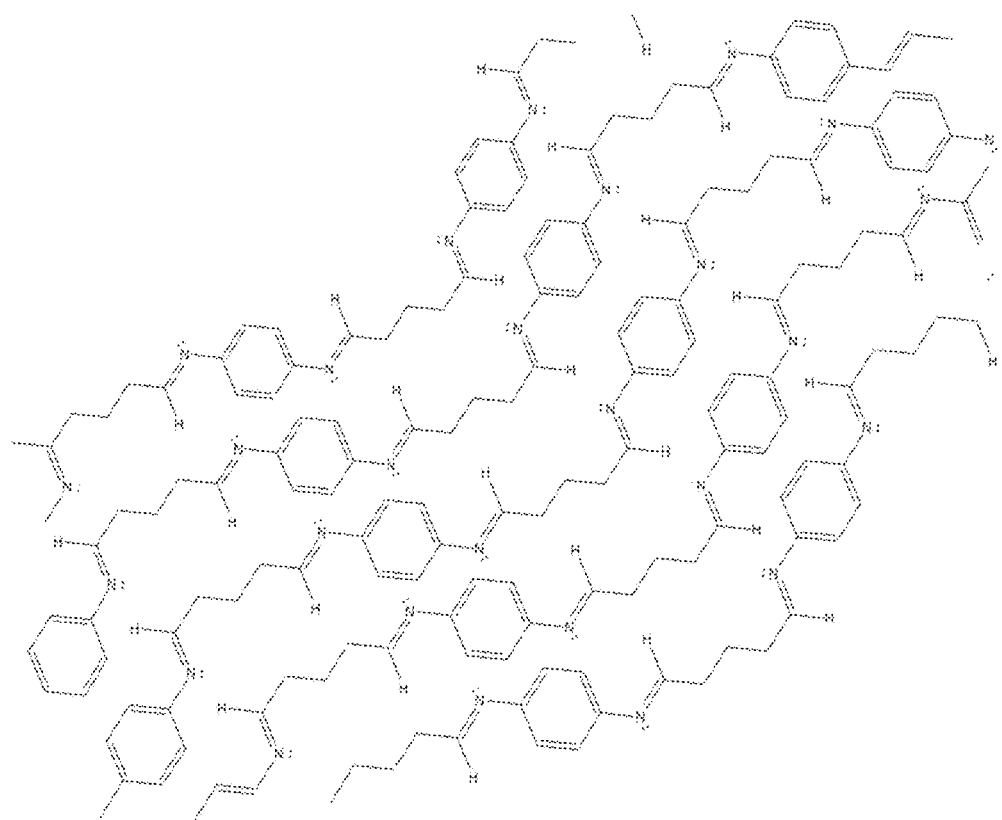

FIG. 5 illustrates the structure of fully hydrolyzed aramid backbone molecules subjected to a full condensation process with glutaraldehyde.

Figure 6:
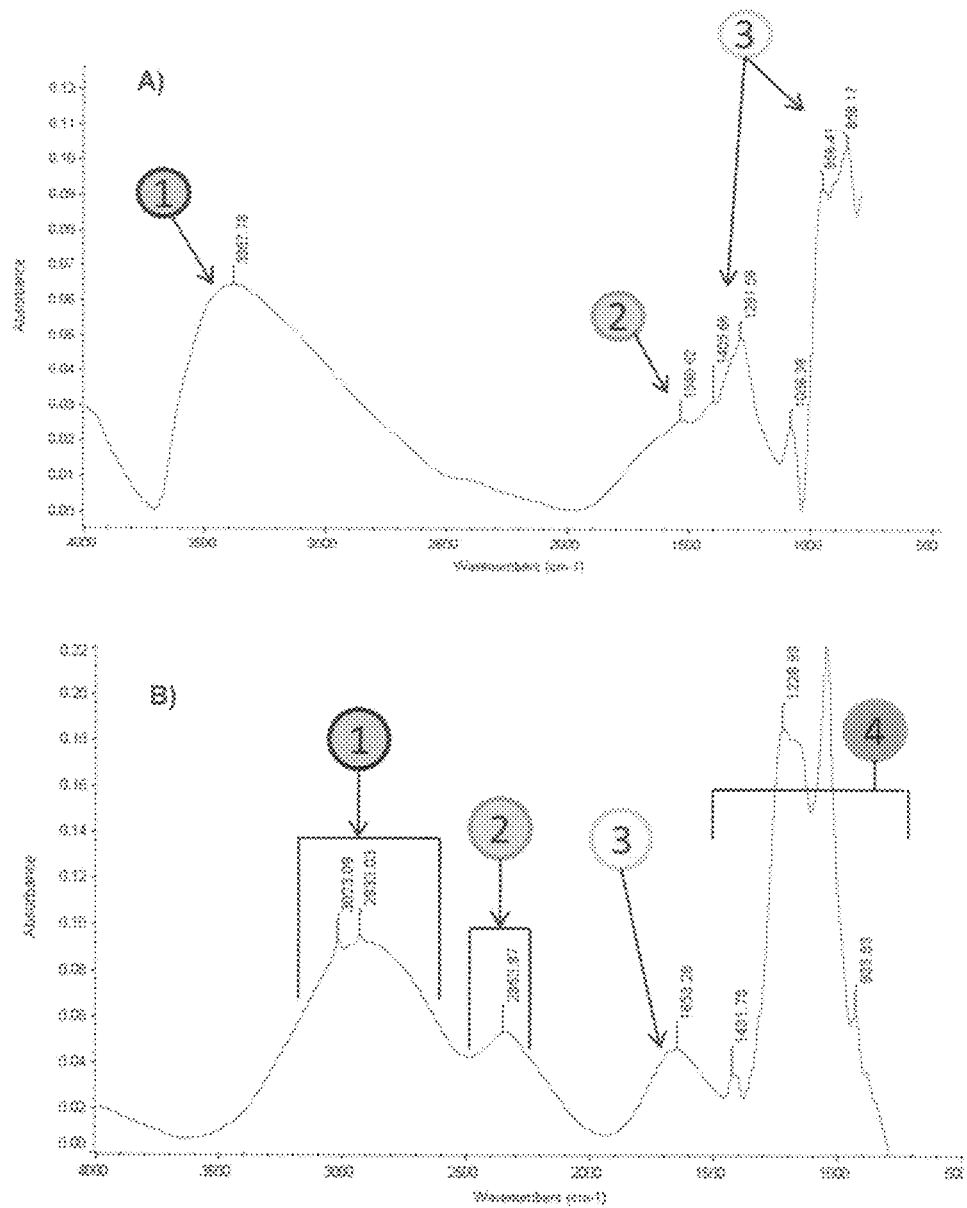

FIG. 6 A) illustrates the FTIR spectrum of the liquid product with stoichiometric excess of PA/GA reagents, showing peaks at 3350 $cm^{-1}$ (1), 1500 $cm^{-1}$ (2), and the fingerprint region (3). B) illustrates the FTIR spectrum of the liquid product with limited amounts of PA and GA, showing peaks at 3023 and 2993 $cm^{-1}$ (1), 2354 $cm^{-1}$ (2), 1653 $cm^{-1}$ (3), and the fingerprint region (4).

Figure 7:
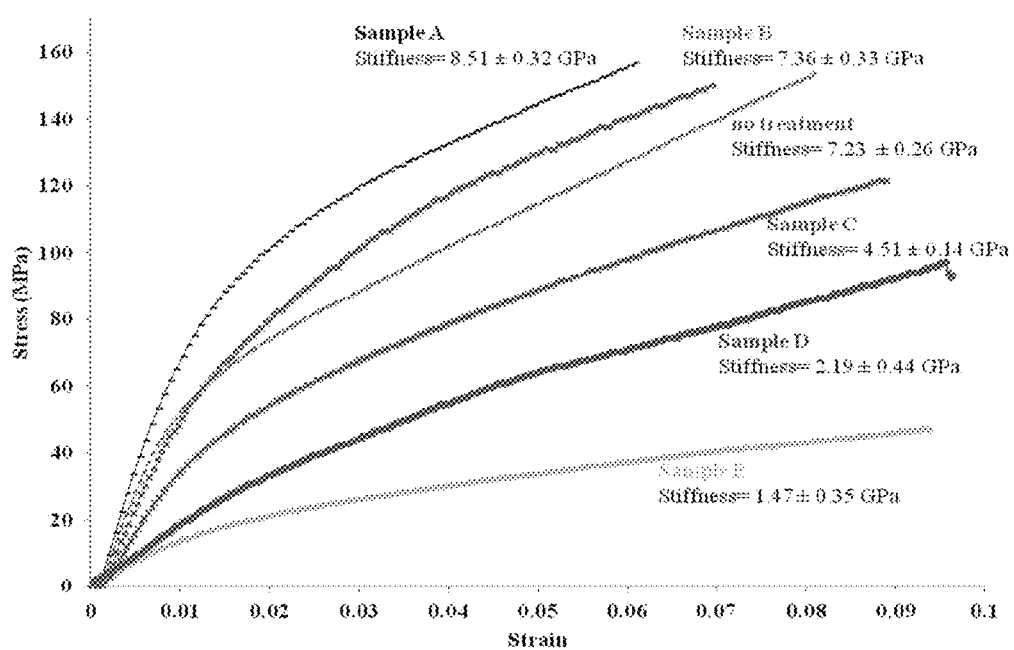

FIG. 7 illustrates stress-strain curves of Aramid nanofiber networks as functions of PA and GA contents and aramid nanofiber network with no treatment, assembled by vacuum-assisted filtration.

Figure 8:
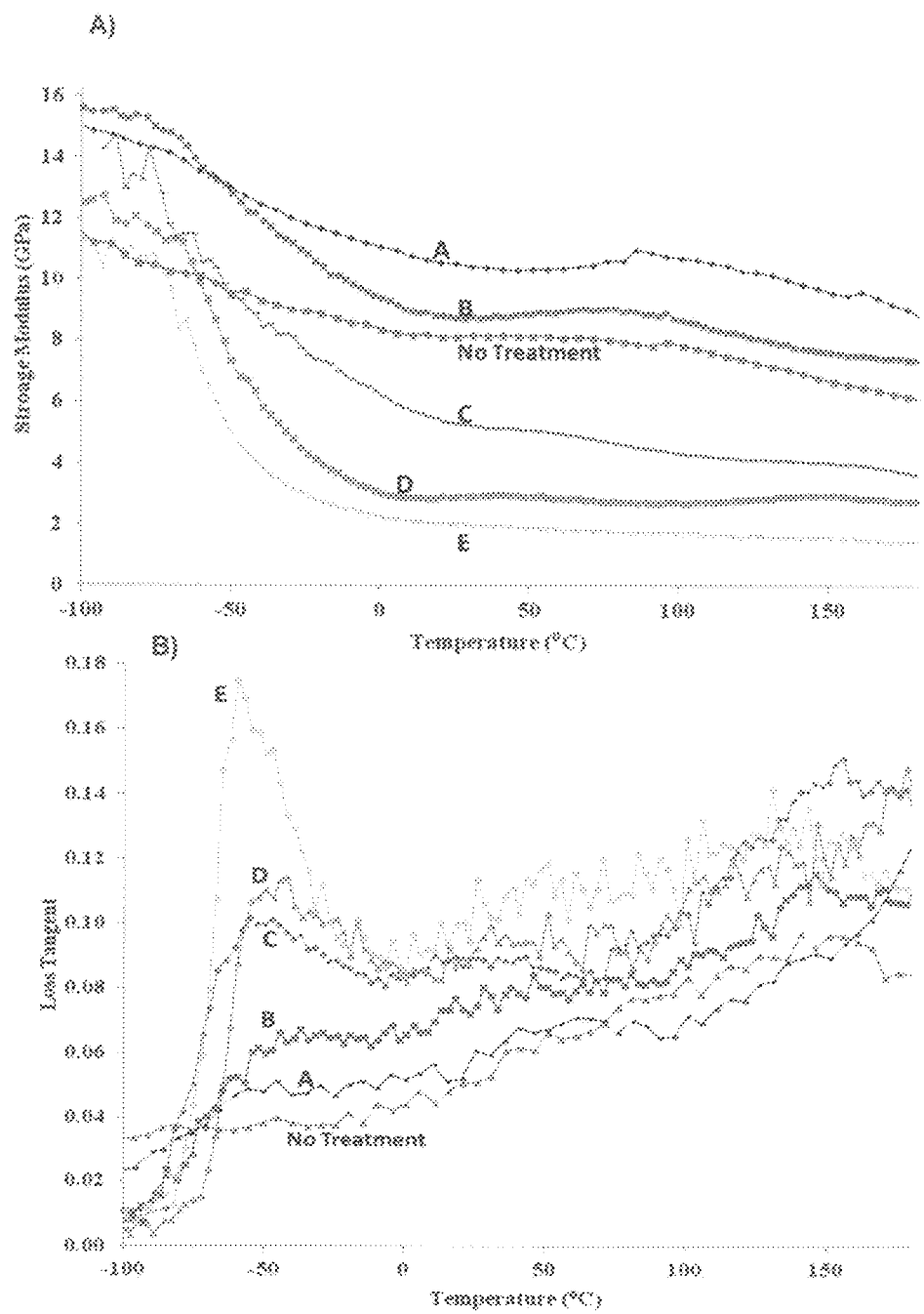

FIG. 8 illustrates the storage modulus (8A) and loss tangent (8B) vs. temperature at 1 Hz of aramid nanofiber networks with PA/GA-treatment and no treatment, prepared by vacuum-assisted filtration.

Figure 9:
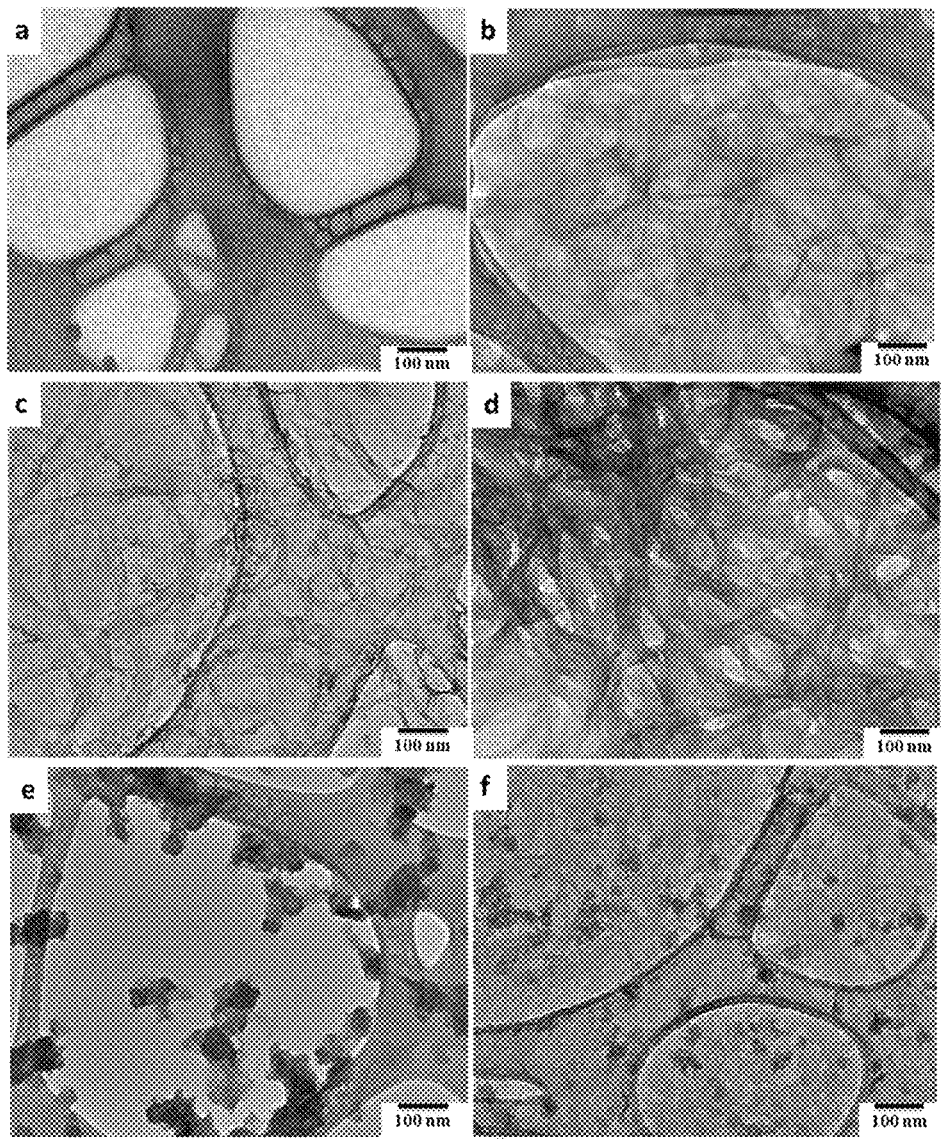

FIG. 9 illustrates TEM images showing a) a carbon-coated holey copper grid used as a support film for TEM characterization; b) aramid nanofibers dispersed in DMSO solution with no treatment; c) limited PA treatment preserved most nanofibers without turning them into discontinuous nanosheets, as in Sample A with 0.25 mL PA used for 100 mg Kevlar; d) GA crosslinked aramid nanofiber network based on (c) which has increased stiffness, strength and thermal resistance than aramid nanofiber network with no treatment (FIGS. 7 and 11); e) PA-catalyzed, hydrolyzed aramid nanofibers turning into reactive nanoscale sheets after 1 mL PA was used for 100 mg Kevlar (as in Sample B and C, FIG. 7); f) restored aramid network from nanosheets in (e) after 1.5 mL GA was added in PA-treated Kevlar DMSO solution, (as in Sample B).

Figure 10:
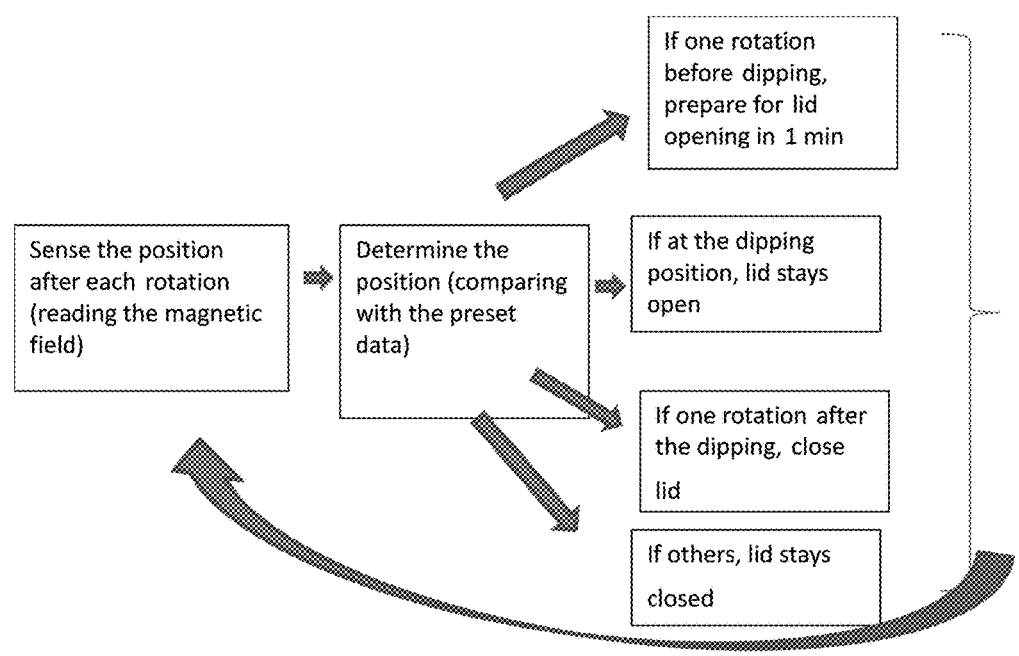

FIG. 10 illustrates a flow chart of an algorithm for operating an LBL robot.

DETAILED DESCRIPTION

In one embodiment, aramid nanofibers are provided that have a diameter of 3 to 100 nm. In various embodiments, the diameter of the nanofibers is on the order of 3 to 30 nm. The nanofibers have a high aspect ratio, in that the length of the nanofibers is at least five times, at least ten times, or at least 20 times their diameter. In various embodiments, the nanofibers have lengths of 0.1 to 10 micrometers, for example 1 to 10 micrometers or 5 to 10 micrometers.

In one embodiment, the nanofibers are prepared as suspensions in a suitable solvent such as DMSO. Suspensions contain aramid nanofibers and an aprotic solvent such as DMSO. The suspension optionally further contains water. If water is present in the suspension, it is present in a volume ratio of water to aprotic solvent in a range of 1/1,000 to 1/20, in non-limiting example.

In another embodiment, aramid nanofiber films are provided that contain a plurality of aramid nanofibers as described herein. In various embodiments, the films are made from the suspensions further described herein. For example, films can be prepared using a layer-by-layer (LBL) assembly method. In various embodiments, the LBL assembled composite is made of 10 to 2,000 individual deposited layers, 10 to 1,000 deposited layers, or 100 to 500 individual deposited layers. In other embodiments, the films are prepared from the suspensions by collecting the solid suspended nanofibers on filter paper, for example with the use of vacuum assisted filtration. The films have desirable physical properties based on the presence of the nanofibers, which are available for the first time.

In another embodiment, the invention provides a process for making the suspension of aramid nanofibers in a solvent. An aprotic solvent such as DMSO has been found to be suitable for the synthetic method. As a first step, a conventional aramid fiber (of micro or macro dimensions) is subjected to an optional first step involving exposing the aramid material to ultrasound energy while the aramid material of macro dimensions is in contact with a solvent. N-methylpyrrolidone (NMP) has been found to be a suitable solvent. The aramid material undergoing exposure to the ultrasound energy is made of fibers having a diameter of greater than 1 micrometers, in non-limiting example.

After pretreatment of the aramid material with ultrasound, the aramid material is removed from the solvent and combined with a solution containing a base and an aprotic solvent. In preferred embodiments, the base is KOH and the aprotic solvent is DMSO. Thereafter, the aramid material is reacted in the KOH/DMSO solution at a temperature below 50° C. for times sufficient to produce aramid nanofibers having a diameter 3 to 100 nanometers, 3 to 50 nanometers, or the like. The nanofibers are produced in situ and are suspended in the solution. It is found that under these conditions, the aramid material does not proceed to molecular dimensions where it could be considered as having been dissolved in the solvent. Rather, discrete nanofibers can be visualized in the suspension and in films produced from the suspension, which show the nanofibers having diameters less than 100 nm and high aspect ratios as described. The reaction in solution to prepare the suspension is carried out at low temperatures and can be carried out at room temperature or about 20 to 30°, for example, 25° C.

In various embodiments, the KOH/DMSO solution can contain water in a volume ratio of water to DMSO of 1 to 20 to 1 to 1,000. In a non-limiting embodiment, the reacting solution contains equal parts by weight aramid material and KOH. Further, the aramid material and the base are present in relatively minor amounts in the solution, making up for example about 0.05 percent to about 5 percent by weight of the solution. In one embodiment, the weight of the KOH and the aramid material is about 7.6 percent by weight of the suspension.

As noted, films can be prepared from suspensions of aramid nanofibers made by the above method, either by LBL assembly or by vacuum assisted filtration to recover the solid nanofibers. It is also possible to further treat the aramid nanofibers in the suspension to obtain a surface treated aramid nanofiber. In this method, after the aramid nanofiber is produced in suspension, further reaction steps are carried out on the nanofibers. Because the aramid material is present as a fiber suspended in the solution, the subsequent reactions in the method being discussed are characterized as surface treatments, as they are apparently working on the surface of the solid nanofibers. Nevertheless, the reactions are described and rationalized on the basis of known chemical processes such as those that would occur in solution. Although the invention is not limited to theory, it is likely that at least some of the reactions with the aramid material in this method follow along the lines of the solution reactions described further below.

Thus in one embodiment, after the suspension of aramid fibers is prepared as shown above, an acid such as phosphoric acid is added to the suspension to hydrolyze the aramid nanofibers. After hydrolysis in this way, a crosslinker molecule is added to the solution, where it reacts with available amide nitrogen atom produced by the hydrolysis. In various embodiments, the crosslinker has a plurality of functional groups capable of reacting with the amide nitrogens of the hydrolyzed aramid nanofibers.

In yet another embodiment, a film comprising surface treated nanofibers can be produced from a suspension of surface treated aramid nanofibers using the LBL assembly technique or a vacuum assisted filtration, in non-limiting examples.

As noted, the films comprising aramid nanofibers described herein have advantageous properties, including but not limited to improved toughness, improved strength, and the like. The films containing nanofibers can be used in various applications alone. Alternatively, hierarchical films can be made that contain a layer of aramid nanofibers and at least one layer of a different polymeric material, wherein further each layer can be the product of LBL assembly with multiple individual applied layers. Such other polymeric materials can be assembled layer by layer along with the aramid nanofiber layers, or can be prepared separately (such as by casting or other means) and joined with the nanofiber films. In one embodiment, all layers having a second polymeric material are separately prepared and joined with the nanofiber films by hot pressing or other techniques. Non-limiting examples of second polymeric materials useful in such processes include polyurethanes and polyacrylic acids.

Aramid Material

The aramid material described herein is made of aramid polymers, generally in the form of fibers, threads, or yarns. Aramid fibers of micro or macro dimensions are commercially available. Typically a commercially available aramid fiber is characterized by a diameter in the micro range, for instance by a diameter of one micron or greater. In one aspect, the current disclosure provides methods for transforming the commercially available microsized aramid fibers into aramid nanofibers.

Aramid polymers are defined as those that contain aromatic groups and amide linkages in the backbone. Normally, the amide groups provide linkages between adjacent aromatic groups. In one aspect, an aramid polymer is characterized as one in which at least 85% of the amide groups in the backbone are directly attached to two aromatic groups, especially where the aromatic groups are phenyl groups.

Two popular aramids are para-aramid fiber and meta-aramid fiber. The former is well known under the trademark of Kevlar® and others. Its backbone consists of phenyl groups separated by amide linkages, wherein the amides link the phenyl groups in a para configuration. A para-aramid represented by Kevlar is also called a poly (para-phenylene terephthalamide) (PPTA). Although the synthesis is not limited to reacting the particular monomers, in a simple form, a PPTA can be understood as the reaction product of para-phenylene diamine and terephthaloyl dichloride. In similar fashion, a meta-aramid such as illustrated by Nomex material can be understood as the product as para-phenylene diamine and isophthaloyl dichloride.

Besides meta-aramids like Nomex and para-aramids like Kevlar, other aramid fibers are available of the copolyamide type. Copolyamides have structures that result from polymerizing other aromatic diamines with terephthaloyl or isophthaloyl chlorides, alternatively in the presence of para-phenylene diamine. In whichever way the aramid fibers are produced, it is believed that the useful physical properties of the fibers derive from the stiff nature of the polymers and orientation along the fiber direction of the aromatic chains.

Nanofibers

Aramid nanofibers are defined by their composition and by their dimensions. Aramid nanofibers are made of aramid material such as discussed above. By nanofibers is meant that the diameter is in the nanometer range, and especially in the range of 3 to 100 nanometers, 3 to 50 nanometers, 4 to 40 nanometers, 3 to 30 nanometers, and 3 to 20 nanometers. In addition to diameters in the nanometer range, the aramid nanofibers are characterized by a high aspect ratio, meaning that the length of the fibers is at least 5 times, at least 10 times, or at least 20 times the diameter. In various embodiments, the length of the aramid nanofibers is greater than 0.1 microns or greater than 1 micron. Non-limiting examples of the length of the aramid nanofibers includes 0.1 to 10 microns and 1 micron to 10 microns.

Films

Films are made from suspensions of aramid nanofibers and suspensions of surface treated aramid nanofibers. For example by layer by layer assembly or by filtration, especially vacuum assisted filtration. Films prepared in this way from aramid nanofibers have enhanced property due to the nanosizing of the aramid material and to subsequent surface treatment of the nanofibers.

Layer by layer (LBL) assembly of nanofiber films from suspensions of the nanofiber is carried out in a way analogous to conventional LBL assembly from solutions. After depositing a first layer on a substrate to establish a suitable ionic layer for attachment of aramid nanofibers, the substrate is dipped in a suspension of the nanofibers for a short period of time and removed. After the substrate is removed from the suspension, the substrate is treated to remove solvent and to wash off non-adhered fibers. Following the rinse and solvent removal, the process is repeated and another layer of aramid nanofibers is applied. The process is repeated until a desired number of separate layers of aramid nanofibers is applied to the substrate. Depending on the proposed use of the film, the number of applied layers ranges from 20 to a thousand or more. The LBL assembly method can be carried out by hand, although especially for high numbers of applied layers, it is usually preferred to automate the process with robots and the like. If desired, composites with many more individual layers, even up to millions, can be made by preparing a number of composites having a suitably high number of layers, and then combining them together by hot pressing or other method. In this way, composites can be made with up to 10,000 layer, up to 100,000 layer up to 500,000 layer and even layers of a million of higher. Commercial machines are available that prepare multiple layer LBL films automatically. A robot and a specially designed method for automation is described further herein.

In another method, films are provided by collecting nanofibers on a substrate by filtration. Normally, vacuum assisted filtration is used. LBL assembly of a plurality of layers of nanofibers produces a useful film. In some embodiments, hierarchical films are put together by using multilayer aramid nanofiber films (produced either by LBL assembly method or by vacuum assisted filtration) together with films made of other polymeric materials. The films made of other polymeric materials can be LBL assembled along with the aramid nanofiber films. In other embodiments, the films made of other polymeric materials can be made separately and then combined together with the aramid nanofiber films, such as hot pressing on the like. To make the hierarchical films, separate layers having different stiffness, ductility, and other properties are combined as desired to produce a film having characteristics for an intended use. Further non-limiting examples are given in the section below.

Making Suspensions of Aramid Nanofibers

The process begins with commercially available aramid fibers having macro dimensions. Suitable aramid materials include those represented by the Kevlar® and Nomex® trade names and by aromatic copolyamide materials.

In a preferred first step, an aramid fiber is treated with ultrasound in a solvent to swell the fiber as a preliminary step in the manufacture of a nanofiber. Examples of ultrasound treatment are given in the examples below. It has been found suitable to sonicate the starting material aramid fiber in a solvent such as NMP to swell the fiber before further reaction. After the ultrasound treatment, the swollen fiber is removed from the NMP solvent and combined in another solvent in the presence of a base. The fiber is then reacted with the base and the solvent at low to ambient temperatures for a time until nanofibers are formed. Advantageously, the temperature of reaction is at 50° or less, at 40° or less, or at 30° or less. In various embodiments, the temperature of reaction is 20 to 50° C., 20 to 40° C., or 20 to 30° C. Reaction can be carried out at or about 20° C. or at or about 25° C. Reaction at 25° C. is considered to be at room temperature.

In a preferred embodiment, the solvent used to prepare the nanofibers is dimethyl sulfoxide (DMSO) and the base is potassium hydroxide (KOH). Preferably, the base is provided in stoichiometric excess to the aramid material, and is conveniently applied in a one-to-one weight ratio. Relative to the amount of solvent, the combined weight of the base and the aramid material is from about 0.05 to 5%. In an exemplary embodiment, 500 mL of solvent is used, in which 1.5 grams of KOH are dissolved and in which 1.5 grams of aramid fiber material is suspended.

As detailed below, the reaction conditions are sufficient to transform the macro-dimensioned aramid starting material into aramid nanofibers having dimensions as discussed above and further exemplified below. The reaction conditions do not lead completely to dissolution of the aramid material. As a result, the reaction product is a suspension of nanosized aramid nanofibers in a solvent system that preferably contains a DMSO.

In addition to DMSO, the solvent system can contain small amounts of water, for example wherein the volume ratio of water to the solvent (i.e. an aprotic solvent such as DMSO) is from 1/20 to about 1/1,000. In various embodiments, it has been observed that the presence of water leads to production of nanofibers having a smaller diameter. In this way, the diameter of the nanofibers produced by the method can be controlled to a desirable extent.

Surface Treatment of the Aramid Nanofibers

After a suspension of aramid nanofibers is made as described above, the nanofibers can be further treated before using the suspension further to form films and the like. In a particular embodiment, the aramid nanofibers formed in the previous method are acid treated to catalyze hydrolysis in some of the bonds in the polymer backbone of the aramid. In a preferred embodiment, this is carried out by adding phosphoric acid to the suspension of the aramid nanofibers just formed.

After hydrolysis, the hydrolyzed surface treated aramid nanofiber is treated with a cross-linking molecule. The cross-linking molecule reacts with the amide groups of the hydrolyzed nanofibers to reconnect polymer chains that were separated by the previous hydrolysis. In this way, the molecular weight of at the least the surface molecules in the aramid nanofibers is reduced and then recombined by reacting with the cross-linking molecule.

The cross-linking molecule has at least two functional groups that are capable of reacting with the hydrogen atoms of amide groups exposed in the aramid nanofibers by action of the acid used in the hydrolysis. Non-limiting examples of functional groups that can react with the amide hydrogens include organic chlorides, aldehydes, ketones, and epoxies. An example of a cross-linking molecule containing two halides is dichloroethylene (DCE). An example of a cross-linking containing two aldehydes is glutaraldehyde. Another example of a crosslinker is citric acid, which contains four functional groups (three carboxyls and a hydroxyl) that can react with the hydrolyzed polymer.

In various embodiments, the crosslinker is a citric acid modified gold nanoparticle. In such a modified nanoparticle, citric acid is bonded non-covalently to the surface of the nanoparticle, probably through one of the citric acid carboxyl groups. This bonding leaves the other three functional groups of citric acid free to react with functional groups on the acid hydrolyzed aramid chains. To crosslink, a citric acid modified gold nanoparticle is added as crosslinker to the product of hydrolysis that results from treatment of the aramid nanofibers with an acid such as phosphoric acid.

Another way of forming a crosslink is to first react the hydrolysis product with citric acid to form covalent bonds with functional groups on the hydrolysis product. Following this, gold nanoparticles are added, which bond non-covalently to one of the functional groups on the citric acid. Gold nanoparticles are commercially available and are available in a number of sizes. Non-limiting examples include ones with a diameter of 13 nm or a diameter of 60 nm.

In another embodiment, the crosslinking is provided by gold nanoparticles themselves. In an example, the hydrolyzed aramid network is reinforced by adding chloroauric acid ($HAuCl_4$) into the solution containing the acid-hydrolyzed aramid polymer. In a non-limiting example, upon the completion of acid hydrolysis (such as by reacting with phosphoric acid), chloroauric acid is added to the solution, for example a hydrolyzed Kevlar DMSO solution, which is then heated, for example at 80° C. for two hours. The resulting suspension is filtered for example at room temperature and a solid film is obtained after the solvent is evaporated. This method yields gold nanoparticles with diameters of 2-4 nm without using citrate. In a non-limiting illustration, the film contains 3.6 mg of gold to 40 mg of aramid polymer. In another illustration, the synthesis method improves network stiffness by 28%, strength by 110% and strain to failure by 38% when using a 8.2 wt % of gold nanoparticles After surface treatment by hydrolysis and cross-linking, the reaction product is a suspension of surface treated nanofibers in a solvent, with optionally incorporated nanoparticles such as gold nanoparticles. The surface treated nanofibers can be further processed by LBL assembly or by vacuum filtration to produce films by methods such as those described herein.

Various aspects of the invention have been described with respect to preferred embodiments. Further non-limiting description of aspects of the invention is given in the examples that follow.

EXAMPLES

Example 1

Preparation of Aramid Nanofiber Solutions

One g of bulk Kevlar 69 (from Thread Exchange, right twist) and 1.5 g KOH were added into 500 ml dimethyl sulfoxide (DMSO) which was magnetically stirred for 1 week at room temperature forming a dark red solution of ANFs. For the preparation of ANF films, the microscope glass slides used in LBL assembly were cleaned in piranha solution (3:1 $H_2SO_4$:$H_2O_2$) for 24 h, followed by thorough rinsing with deionized water prior to use.

LBL Assembly of Aramid Nanofibers

A clean piece of glass slide was first dipped into 1% poly(diallyldimethylammonium chloride) (PDDA) solution for 1 min and rinsed with water for 2 minutes before air drying. As the piranha solution treatment leaves the surface of the substrate negatively charged which results in electrostatic repulsion of ANFs with the same charges, the initial layer of PDDA is essential for film growth, without it no Kevlar is observed on the substrate. The PDDA coated glass slide can then be used for the deposition of ANFs. The PDDA coated glass slide was dipped into the Kevlar DMSO solution for 1 minute and rinsed with water for 2 minutes before air drying and this sequence of steps was repeated 300 times. The film is easily peeled from the substrate by immersing in 1% HF solution.

Instruments and Testing

Atomic-force microscopy (AFM) experiments were performed in tapping mode using a NanoScope Ma (Veeco Instruments, Santa Barbara, Calif.). The sample for AFM testing was prepared by immersing a PDDA-coated silicon wafer into Kevlar DMSO solution followed by water rinsing and air drying. Transmission-electron microscopy (TEM) characterizations of Kevlar/DMSO diluted aqueous solutions were obtained using a JEOL 3011 high-resolution electron microscope. One drop of the different solutions was placed on the surface of a copper grid coated with carbon and dried in the oven at 110° C. before testing.

For TEM observation of the single bilayer PDDA/ANFs, a TEM grid was coated with PDDA and then with ANFs using an LBL assembly process similar to that used with the glass slides. Scanning-electron microscopy (SEM) images were obtained from a gold-coated film using an FEI Nova NanoLab dual-beam FIB and scanning electron microscope on gold-coated film. The LBL film growth was monitored using an 8453 UV-Vis ChemStation spectrophotometer (Agilent Technologies) with a fresh, piranha-cleaned glass slide used as a reference. Ellipsometry measurements were obtained using a BASE-160 Spectroscopic Ellipsometer (J. A. Woollam Co., Inc.). The samples used for ellipsometry were prepared on silicon wafers as described previously. Thermogravimetric analysis (TGA) was performed using a Perkin-Elmer DSC-7 (PerkinElmer, Wellesley, Mass.). Resonance Raman spectra were taken with a Dimension-P1 Raman system (Lambda Solutions, Inc.) with 532 nm excitation. IR spectra were obtained using a Nicolet 6700 spectrometer utilizing the grazing angle accessory (Smart SAGA) at a grazing angle of 85°. X-ray diffraction (XRD) measurement was performed using Rigaku rotating Anode XRD with Cu Kα generated at 40 kV and 100 mA, and a scanning speed of 0.2°/min. The mechanical properties of LBL films were tested using a Nanoinstruments NanoIndenter II model provided by MTS Nanoinstruments Inc., Oak Ridge, Tenn. A Berkovich-shaped indenter was used, and the hardness and elastic modulus (indentation modulus) were calculated and recorded from five different testing points. The analysis of nanoindentation data was performed using the Oliver and Pharr method, assuming a value of 0.25 for the Poisson's ratio of the film.

Brillouin light scattering (BLS) measurements were performed in backscattering geometry with an incident angle close to the surface normal, as described elsewhere. In this geometry, light that scattered from phonons propagating in the near out-of-plane direction is collected at 180° from the incident beam. For thin-film samples, the light redirected from a reflective substrate and scattered from phonons propagating in the in-plane direction, akin to the standard platelet geometry, can also be captured by the same collection optics, giving rise to the so-called 2α-peak. This geometry allows for the simultaneous measurement of the in-plane and out-of-plane elastic moduli. Samples were probed using a Coherent Verdi solid-state laser with a wavelength of 532 nm where the laser intensity illuminating the sample was less than 10 mW. The laser light was focused onto the sample with a focusing spot of ~50 μm in diameter and 1 μm in depth. The scattered light was collected over a period of ~30 min, and analyzed using a Sandercock 6 pass tandem Fabry-Perot interferometer. Several measurements were taken at different spots on the film in order to assure reproducibility and film homogeneity. The density of ANFs film was estimated by weighing pieces of rectangular films with known dimensions.

Synthesis of ANFs

High temperatures are known to induce the depolymerization of Kevlar, so we decided to employ a different method of Kevlar dissolution than those used before, which allows for processing to be done at room temperature with minimal reduction of the molecular weight of aramid chains. It was found that the dissolution of Kevlar threads or fabric in KOH splits the bulk macroscale fibers into nanoscale fibers. This process is likely to occur by abstraction of mobile hydrogen from >NH groups and substantial reduction of the strength of hydrogen bonds between the polymer chains, while increasing electrostatic repulsion. Importantly, the extent of this destruction is limited and does not appear to proceed down to the level of individual polymer chains. Complete disintegration of the fibers into individual chains is counteracted by hydrophobic attraction and π-π stacking in the polymer backbone. The diameters of ANFs after the dissolution of Kevlar fabric are 20-30 nm. These diameters decrease with the addition of greater amounts of water, reaching 5-10 nm when the volume ratio of water to DMSO is 1:40 . From the materials perspective this is quite remarkable and very convenient for processing into composites although will require further studies. The length of these fibers appears to be in the range of 5 to 10 μm . ANFs are thicker than single-walled CNTs, which are typically about 1 nm in diameter and several micrometers in length. ANFs are thinner and longer than the cellulose fibers, which are 5-15 nm in diameters and 200 nm to several micrometers in length. Abundance of polar functional groups on ANFs provides additional opportunities compared with CNTs to dramatically improve nanofiber-matrix stress transfer.

ANF Multilayer Assembly

The layer-by-layer (LBL) assembly technique is a versatile method for the preparation of organic-inorganic composites with enhanced mechanical parameters. LBL assembly of ANFs was accomplished by using a traditional LBL dipping however only the first layer was PDDA and therefore will be denoted as PDDA/ANF$_n$ where n is the number of dipping cycles in ANF dispersion. The ANFs are fairly uniformly packed on the surface of glass slide during LBL assembly. The gradual growth of ANF multilayers was monitored by ellipsometry and UV-Vis absorption spectra. The growth of PDDA/ANF$_n$ multilayers is nearly linear with the first 10 layers reaching a film thickness of about 16 nm. This gives a thickness increment for each LBL bilayer of 1.6 nm, which corresponds to fairly loose two-dimensional packing of ANF in each adsorption cycle.

As more LBL cycles are applied, the enhancement of an absorption peak at around 330 nm, which is characteristic of Kevlar, is observed in the UV-Vis spectrum. Although the initial adsorption of negatively charged ANFs on positively charged PDDA can be attributed to electrostatic interactions, intermediate rinsing with water is expected to regenerate the H$^+$ on the aramid macromolecules removed by KOH and near-electroneutrality of the ANFs. Stability of ANF films outside of KOH is attributed primarily to aromatic stacking interactions and hydrogen bonding between the multilayer components, which are also believed to be the main interactions between individual nanofibers. Van der Waals interactions are also expected to contribute to the mechanical integrity of the fibrous network. The successful reconstruction of aramid films with the inclusion of ANFs during the LBL process can be confirmed by Raman scattering. The Raman spectra of the original macroscale Kevlar material are similar to the results reported before, but they are changed after the dissolution in KOH DMSO solution. These changes disappear after the construction of the ANF films and the Raman spectra of the final films are nearly the same as those of the original Kevlar fibers.

Identification of molecular structures of ANFs in the film was also confirmed by IR spectra. Compared with Kevlar macrofiber, the intensity and sharpness of IR peaks (for example, N—H stretching vibrations) is decreased due to broader distribution of bond lengths and surface states of the fibers. XRD measurements also show broadening of characteristic Kevlar peaks, which can be assigned to (110), (200) and (004) reflections, respectively. Based on the Scherrer equation, $D=0.92\lambda/\beta \cos\theta$, where D is the size of crystallites, $\lambda$ is the wavelength of X-ray beam used in diffraction experiments, $\beta$ is the line broadening at half the maximum intensity, $\theta$ is the Bragg angle, the diameter of the nanofiber can be calculated to be ca. 4.3 nm based on the broadening of (200) reflection obtained after Gaussian peak fitting. This size of crystalline domains matches well with the diameter of ANF from TEM observations and indicates that the nanoscale fibers retain substantial crystallinity despite reduction in diameter. This fact is also indicative of the retained mechanical properties characteristic of macroscale Kevlar fibers.

Physical Properties

The ANF LBL films are transparent allowing for potential use in ultrastrong surface coatings. They can also be easily peeled from a surface by HF etching. SEM images indicated that a PDDA/ANF$_{300}$ film has a thickness of about 580 nm, which is comparable to the results of ellipsometry measurements and suggests that the average ANF layer is about 1.9 nm thick. Thermogravimetric analysis (TGA) of PDDA/ANF$_{300}$ is similar to the bulk Kevlar material. This is very encouraging because heat-resistant, flexible, transparent films represent a bottleneck for many applications in flexible electronics and flexible photovoltaic cells based on semiconductors with high electron/hole mobility.

It is expected that PDDA/ANF$_n$ films will be elastically orthotropic, with the in-plane and out-of-plane properties being different as is the case with clay and many other multilayers. Brillouin light scattering (BLS) is a convenient method to determine the orthotropic moduli. The in-plane and out-of-plane longitudinal moduli were determined to be 22±1.2 GPa and 11.8±0.6 GPa, respectively. A higher in-plane modulus is expected as ANFs are spread on the substrate with axes parallel to the plane. PDDA/ANF$_n$ films outperform a well-known high-performance polymeric coating material, i.e., polyimide thin film with 17.7 GPa in-plane longitudinal modulus and 7.7 GPa out-of-plane longitudinal modulus recently probed by a similar technique. These mechanical properties of PDDA/ANF$_n$ films also exceed those for cellulose nanofibers with no effect of humidity that greatly reduces the performance of cellulose LBL films. Furthermore, the Young's modulus is 10-20 times higher than that of aligned cellulose fibers and CNTs.

The compression stiffness and hardness of the ANF LBL films were estimated using a Berkovich nanoindenter at various indentation depths. Care was taken to ensure that the depths of the indentations were shallow enough to avoid significant influence from the substrate, which was indeed detected at greater penetration depths. The tests revealed a hardness of 0.46±0.04 GPa for the film, which is higher than some high strength polymers, such as isotactic polypropylene (H=0.125 GPa) and high-density polyethylene (H=0.06 GPa). The Young's modulus was obtained using the continuous stiffness measurement technique of Oliver and Pharr during both the loading and unloading portions of the indentation. The film was found to have a modulus value of 9±1 GPa, and the value appeared not to be affected by the substrate for indentation depths of less than 200 nm. The modulus of the films was higher than the 5.5 GPa reported for a cast film of pure Kevlar. This indicates that the preparation of ANFs is indeed advantageous for preparation of high-performance materials. Solvent-based LBL process is particularly effective at producing reasonably dense and better ordered arrays of the nanofibers, compared with the casting technique. The modulus is also higher than the reported elastic modulus obtained from nanoindentation of various uniaxial anisotropic polyimide films, which were in the range of 5 to 7 GPa. Since BLS measures the longitudinal modulus, the corresponding Young's modulus can be extracted, assuming a Poisson's ratio of 0.25, resulting in a value of 9.8±0.5 GPa, which compares remarkably well with the nanoindentation measurement of 9±1 GPa.

Example 2

2.1 Synthesis

Dissolution of Kevlar Fibers in Dimethyl Sulfoxide

The dispersion of aramid nanofibers was achieved by reacting Kevlar® with potassium hydroxide (KOH) in a dimethyl sulfoxide (DMSO) solution. 1.5 g of Kevlar 69 yarn (Thread Exchange Inc., right twist) were soaked in 1-methyl-2-pyrrolidinone (NMP) (anhydrous, 99.5%, Sigma-Aldrich) and sonicated for two days to swell the fibers within the yarn and to promote the subsequent dissolution in an organic solvent DMSO. After sonication, the Kevlar® was washed in de-ionized water, thoroughly dried, and mixed with 1.5 g KOH (99.9% Semiconductor Grade, Sigma Aldrich) in 0.5 L of DMSO (99.9%, Sigma Aldrich).

This induced a deprotonation reaction of Kevlar® by KOH. The Kevlar/KOH/DMSO mixture was stirred vigorously at room temperature for seven to nine days until the solution turned viscous and dark red, indicating the Kevlar® was fully dissolved. The resulting solution consists of a suspension of aramid nanofibers with diameters of 3 to 30 nm and lengths on the order of 10 μm.

Vacuum-assisted Filtration of Phosphoric Acid/Glutaraldehyde-treated Kevlar®

In order to understand the effect of phosphoric acid (PA) and glutaraldehyde (GA) on aramid nanofibers in DMSO, a synthesis process was designed to study the mechanism of PA and GA treatment. This involved PA-catalyzed hydrolysis of Kevlar and GA-condensation of hydrolyzed Kevlar, followed by recovery of the solid product through vacuum-assisted filtration.

Acidic Hydrolysis of Aramid Nanofibers

First, acidic hydrolysis of aramid nanofibers was achieved by mixing Kevlar-DMSO solution with phosphoric acid (85 wt % in water, Sigma Aldrich). The amount of acid used was varied to control the extent of reaction and is listed in Table 1 in section 2.3. The mixture was heated to 373 K and vigorously stirred for 5 hours. The temperature was carefully monitored and held below 383 K, at which DMSO may combust, but above 363 K to induce thorough hydrolysis of the amides on the Aramid backbone molecules. The hydrolyzed Kevlar solution was a light-yellow liquid with solid precipitates of protonated Kevlar nanofibers.

Condensation of Hydrolyzed Aramid Nanofibers with GA to Induce Imine Formation

Glutaraldehyde (50%, Fisher BioReagents), a crosslinking agent was added to the hydrolyzed Kevlar-DMSO solution after the hydrolysis reaction was complete. The amount of GA used depended upon the desired extent of reaction and is listed in Table 1 in section 2.3. The mixture was stirred at 373 K for three to four days. The condensation progression was monitored from the color of the mixture, which darkened and became cloudier with increased processing. The process was assumed to be complete when the color stabilized.

Vacuum-assisted Filtration of the Reacted Product

The resulting suspension was filtered using a hydraulic-powered pressure differential connected to a filtration flask. After pouring the products onto filter paper in the funnel, which was secured by a rubber bung on the top of the flask, a constant flow of water was used to create a pressure differential in the flask for 10-15 minutes until all the liquid was removed. This left a film of solid material on the filter paper. The color of the film ranged from dark-yellow to brown, depending on the extent of the reaction, which is discussed further in section 2.3. A transparent-brown solution was recovered from the filtered solvent. Both the solid and liquid products were kept for subsequent analysis.

Solid Product Drying and Cleaning

To remove any residual absorbed solvent, the recovered solid and the filter paper was placed in a 338 K oven for one day. After the drying process, the film was relatively homogeneous, dark-yellow or brown, and could easily be separated from the filter paper using a razor blade.

2.2 Characterization

Fourier Transform Infrared Spectroscopy

Fourier-transform infrared (FTIR) spectroscopy (Nicolet 6700, Thermo Electron Corporation) was used to probe the change in chemical structures of the solid and liquid products obtained from the PA/GA treatment. For the liquid products, droplets of the solution were placed on top of a 10 cm diameter gold-silica wafer, covering the entire surface. In order to eliminate the additional FTIR peaks from excess solvent in the liquid products, the wafer was placed in a 338 K oven prior to FTIR inspection until the solvent evaporated.

Transmission-electron Microscopy (TEM) Characterizations

The morphologies of various Kevlar in DMSO solutions after PA/GA treatments were obtained using a JEOL 3011 high-resolution electron microscope at 300 kV. One drop of different solutions was placed on the surface of a holey copper grid coated with carbon (Ted Pella) and dried prior to TEM characterizations.

Thermo-gravimetric Analysis

The PA/GA-treated aramid nanofiber films obtained by vacuum-assisted filtration were characterized by a thermo-gravimetric analyzer (TGA) Pyris 1 (PerkinElmer) using a heating rate of 10° C./min from 25° C. to 900° C. and an air purge at a flow rate of 20 ml/min. The mass of the samples was controlled from 0.4 mg to 1 mg for all tests.

Tensile and Dynamic Mechanical Analysis

The mechanical properties of the filtered films were characterized by uniaxial tensile tests. Test specimens were 1.5 mm wide in the gauge section and 8 to 10 mm long. Each specimen was tested using an RSA 3 dynamic mechanical analyzer (DMA) (TA instruments) under a constant strain rate of $0.005\ s^{-1}$ to ensure quasi-static loading. The load was measured by a load cell with a maximum capacity of 3.5 N and a resolution of 1 μN. Digital image correlation (DIC) with a Grasshopper camera (Point Grey research) was used to measure displacements accurately, and the nominal strain field was computed by MetaMorph microscopy automation and image analysis software (Molecular Devices). Temperature sweep tests were conducted from −100° C. to 200° C. with 10° C./min increments at 1 Hz using the DMA, from which the storage modulus and the loss tangent (tan δ) of the samples were characterized over the temperature range. The tensile and dynamic mechanical analysis data were used to determine the stress-strain responses as well as storage modulus and loss tangent vs. temperature responses. The thickness of the films was determined by scanning electron microscopy (FEI Quanta 3D SEM/FIB and Philips XL30ESEM). The nominal stress was determined from load data divided by the initial cross-sectional area. The Young's modulus was determined from the slope of the initial linear region of the stress-strain response curves. The storage modulus and loss tangent as a function of temperature were computed by Orchestrator software (TA instruments).

2.3 Proposed Reactive Mechanisms of Phosphoric Acid and Glutaraldehyde

Figure 3:
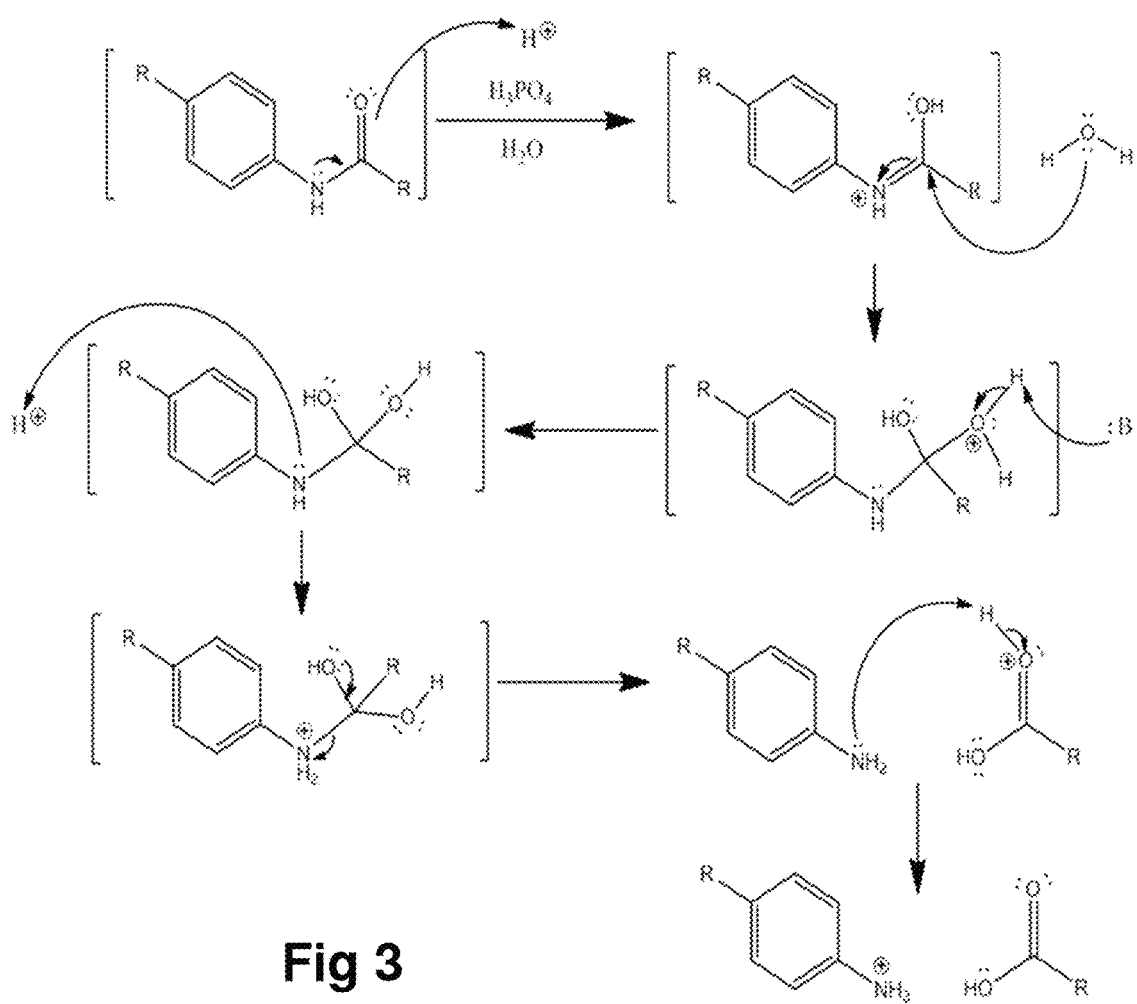
FIG. 3 illustrates the acid-catalyzed hydrolysis of aramid nanofiber using phosphoric acid. R=aramid nanofiber.

Previous research has reported the acid-catalyzed hydrolysis of Kevlar microfibers, and resulted in improvement of the interfacial strength between Kevlar microfibers and epoxy matrices due to the additional functional groups introduced to the microfiber surfaces [Park 2002, Gang 2008]. Phosphoric acid was used in this work, but the process can proceed with other acids as well. It was expected that the dissolved state would promote the reactivity of the aramid nanofibers, however, owing to the basic nature of the Kevlar-DMSO solution, a stoichiometric excess of acid would be needed to ensure the reprotonation of the aramid chains. Initially upon the addition of acid to the Kevlar DMSO solution, some precipitates were observed to form. However, large amounts of the polymer remained dissolved, given that it was possible to further the precipitation through dilution with water. As the reaction proceeded, the precipitate dissolved back into the DMSO owing to the increased polarity and smaller size of the hydrolyzed Kevlar chains. FIG. 3 describes this hydrolysis process.

Figure 1:
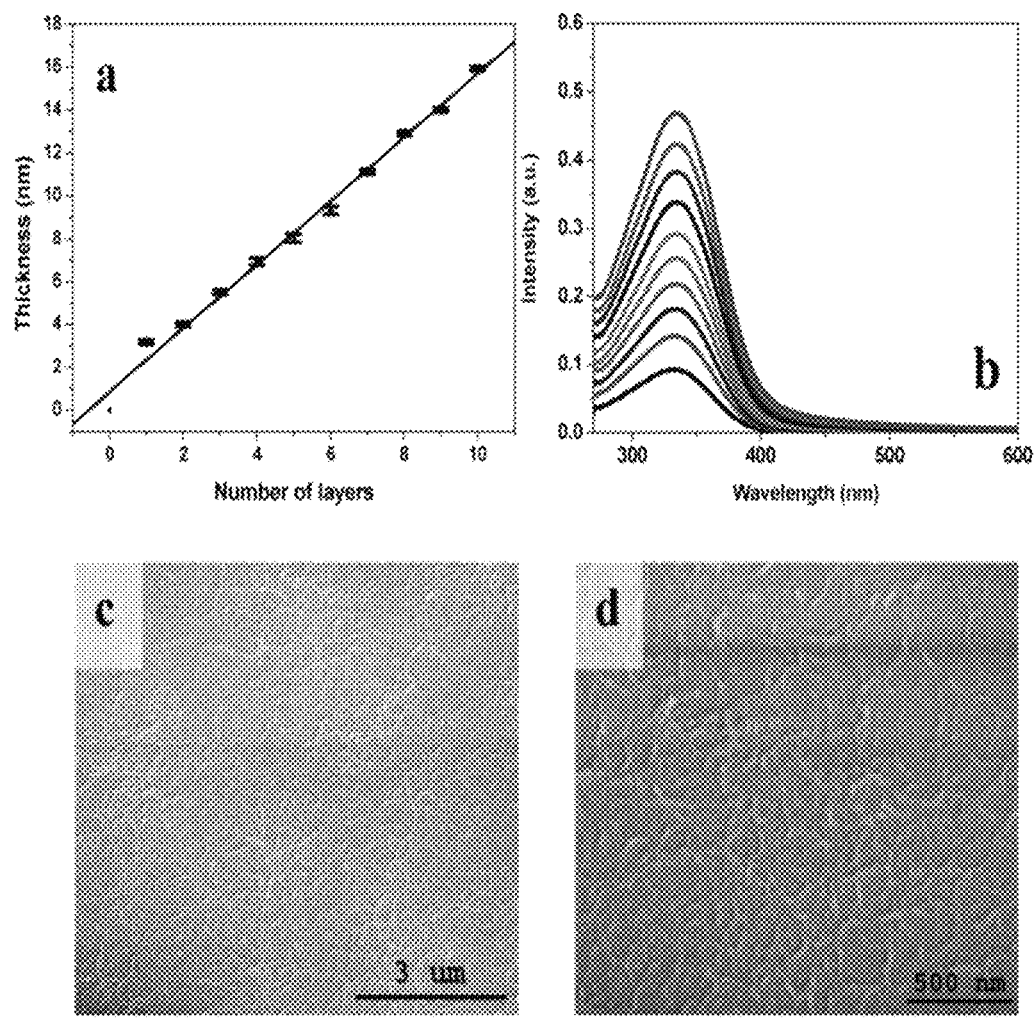
FIG. 1 (a) illustrates the ellipsometry results for LBL assembly of ANFs on silicon substrate. (b) UV-vis spectra of 1-10 layers of ANF films. (c)-(d) are SEM images of one bilayer PDDA/ANFs on a glass slide.
Figure 2:
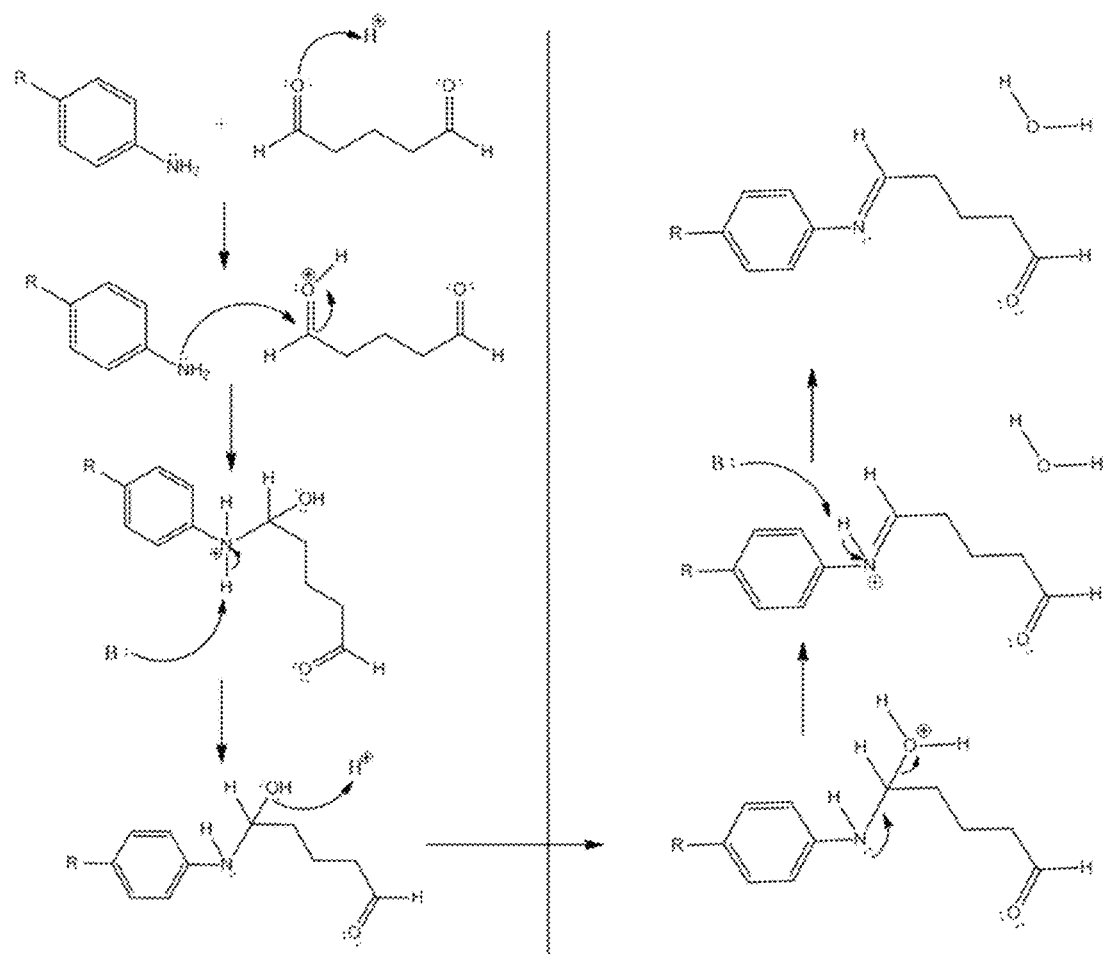
FIG. 2 illustrates the condensation of hydrolyzed aramid nanofiber and glutaraldehyde to produce di-imines. R=aramid nanofiber.

The development of this mechanistic process is of interest, owing to the high reactivity of its products: a primary amine and a benzene-conjugated carboxylic acid per amide of Kevlar backbone molecule. The two resulting functional groups are then reacted with crosslinking agents to connect the hydrolyzed Kevlar backbone molecules and manipulate the polymer properties by adding new structures to the material. For the present we will consider the specific example of glutaraldehyde as the crosslinking agent, but either a di-aldehyde or di-ketone could be used to serve the same purpose. FIG. 2 shows the reactive process responsible for the polymerization owing to the formation of di-imines as the primary amines from the hydrolytic product react with glutaraldehyde (GA). The polymerization is complete as both aldehydes from each GA molecule undergo the reaction portrayed in FIG. 2 and attach to an amine, joining two previously hydrolyzed aramid backbone molecules. GA was selected due to its high reactivity and favorable structure, which involves two aldehydes for reaction with two aramid nanofibers to provide C—C bonds between aramid molecules.

FTIR Spectroscopy to Verify the Reaction Mechanisms

In order to verify the reaction mechanisms of PA and GA with Kevlar, FTIR was used to probe the changes in the microstructures of the aramid nanofiber networks (the solid product) and the remaining solution (the liquid product) after filtration. The spectra performed on the synthetic products showed clear changes with respect to untreated aramid nanofibers, indicating that a reactive process had taken place. This result is in agreement with the theoretical expectations discussed above and confirms the reactivity of the nanofibers.

Pure Kevlar®

The FTIR spectrum of pure Kevlar®, i.e. aramid nanofiber network with no treatment, shows a peak that clearly indicates the stretching frequency (3300 $cm^{-1}$) of nitrogen-hydrogen bonds, which corresponds to the amides from the polymer backbone molecules (peak 1). A strong signal can also be observed at 1650 $cm^{-1}$ (peak 2) representing the carboxyl groups from the amides of aramid structure. The rest of the peaks represent bending frequencies of the amides (peak 3) and of the aromatic carbon-hydrogen bonds in the benzene rings from the polymer backbone molecules (peak 4).

Solid Products

The spectrum for the solid products after the PA/GA treatment is different from that of the untreated aramid nanofiber network. The formation of many peaks around 3500 $cm^{-1}$ can be rationalized by the presence of different oxygen-hydrogen and nitrogen-hydrogen bonds, such as those present in imines from condensation reaction and carboxylic acids from hydrolysis reaction (peak 1). The appearance of a broad peak around 2666 $cm^{-1}$ (peak 2) is indicative of the presence of saturated alkyl chains from glutaraldehyde. The broadening and splitting of the signals around the carbonyl region of the FTIR spectrum (1700-1550 $cm^{-1}$, peaks 3 and 4) is a result of the presence of groups such as aldehydes, carboxylic acids and imines. Different extents of reaction, caused by adding different amount of PA and GA, yielded the same spectra, although variations in peak absorbance and intensity could be observed in each sample. The relatively low wavenumbers of amide carboxyl stretching in the range 1700-1550 $cm^{-1}$ can be rationalized partly by the expected high degree of conjugation due to the polymer structures. Carboxyl groups usually exhibit peaks in the range of 1850-1700 $cm^{-1}$, but as amides are naturally conjugated with relatively low frequencies and as they are located next to aromatic rings in the aramid backbone molecules, there is increased electronic de-localization of the group that reduces the overall wavenumber.

Figure 4:
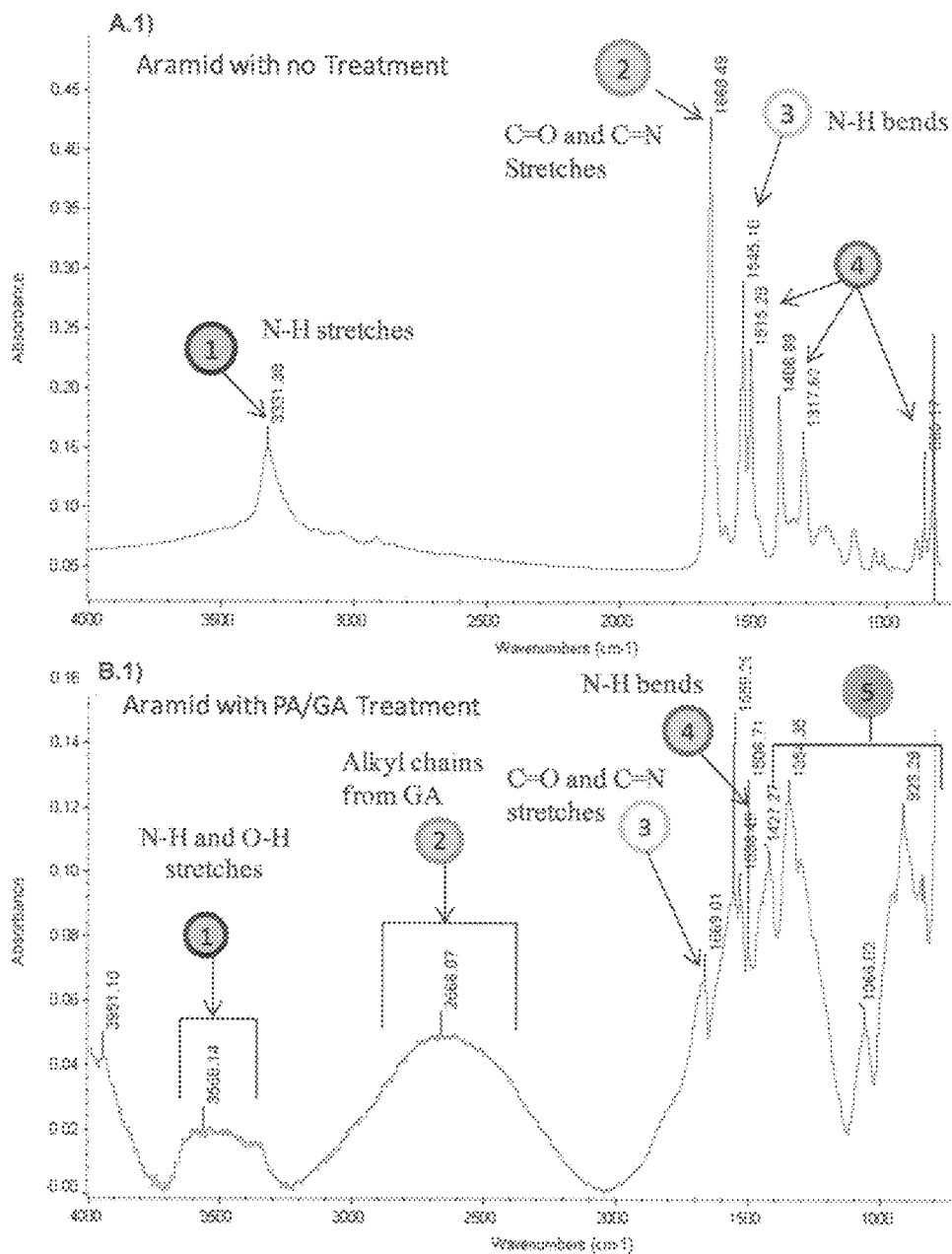
Figure 4:
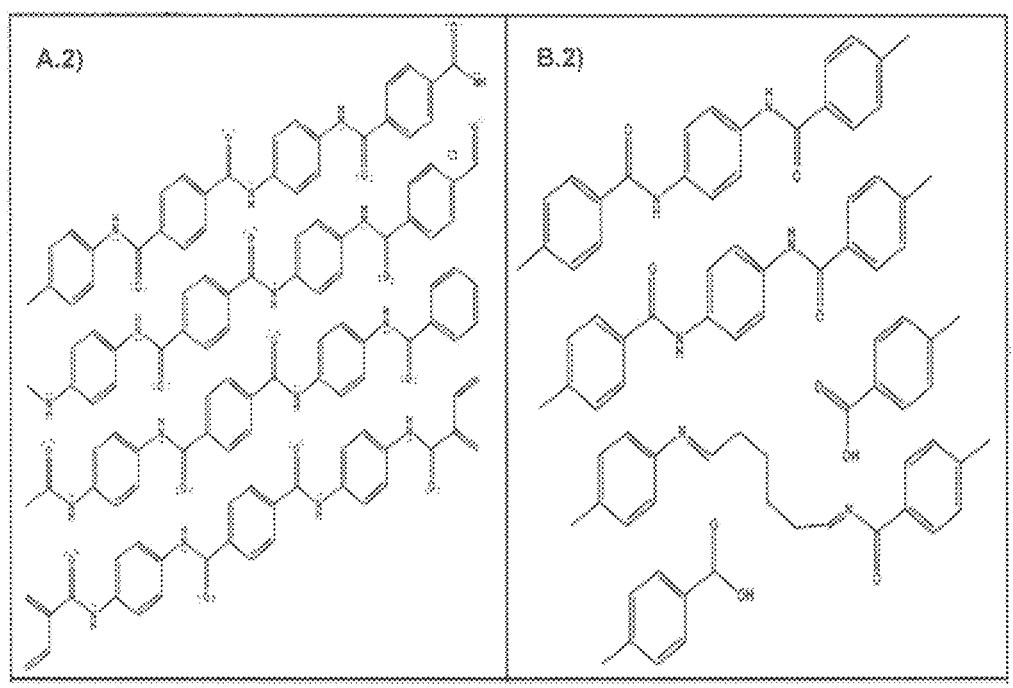

From the additional peaks in the spectra, especially the ones at ~3500 $cm^{-1}$ (peak 1) for nitrogen-hydrogen bonds and at ~1700-1550 $cm^{-1}$ (peak 3) for carboxylic acid, as well as the apparent high degree of peak overlap, it is clear that the solid product shares structural characteristics with aramid and the groups that formed in the reactive processes. This is expected, as most of the samples were not prepared with excess stoichiometric amounts of acid or glutaraldehyde. The proposed structure resulting from this process is shown in FIG. 4 (b.2). A sample subjected to an extensive hydrolysis and a full condensation reaction process would resemble the structure shown in FIG. 5, where a large number of the aramid backbone molecules, including those in the surface and core regions of the nanofibers, have been hydrolyzed and substituted with flexible C—C bonds.

Liquid Products

Two distinct spectra were observed for the liquid residues of the reactive processes after the solid parts had been filtered. The spectrum in FIG. 6 (a) was consistently observed for reactive samples that had been prepared with an excess amount of PA and GA reagents. As a result, it is expected to represent a product solution with a large amount of terephthalic acid, formed due to extensive hydrolysis of the aramid backbone molecules. This prediction is supported by the presence of a broad peak (peak 1 in FIG. 6 a) in the frequency range 3700-2500 $cm^{-1}$, which probably represents OH bonds and could arise from the carboxylic acids and from the water molecules that are formed during the condensation reaction. This result is consistent with the experimental conditions, since there were large amounts of excess glutaraldehyde and water in the liquid product. There was also a set of peaks in the frequency range 1600-1400 $cm^{-1}$ was observed (peak 2 in FIG. 6 a) that probably represents different resonance forms of the highly conjugated C=O bonds present within the liquid, corresponding to the C=O from carboxylic acid and excess aldehydes.

The second characteristic spectrum (FIG. 6 b) was observed for the liquid residue from reactions produced with less than the stoichiometric amounts of the reagents. A very different profile can be observed in this spectrum. The broad frequency range 3700-2500 $cm^{-1}$ (peak 1 in FIG. 6 a) was not present; instead, there was a broad signal between 3500 and 2500 $cm^{-1}$ (peak 1 in FIG. 6 b), possibly from overlaps of several groups. The C—H alkyl bonds between the carbons in dissolved glutaraldehyde could produce the signal at around 3000 $cm^{-1}$. The OH bonds from carboxylic acid produced after hydrolysis are also a possible source for this signal, as these would be in the range between 3000-2500 $cm^{-1}$. Finally, the C—H bonds from the aldehydes in glutaraldehyde are possibly responsible for the sharp peaks at 3023 and 2933 $cm^{-1}$. The signal at frequencies between 2500 and 2000 $cm^{-1}$ (peak 2 in FIG. 6 b) probably correspond to phosphine and phosphorous groups formed from phosphoric acid in the reactive medium, since no other structures are expected to form during the reactions. This peak (peak 2 in FIG. 6 b) was more distinct owing to the decreased amounts of carboxylic acids present in the sample compared to the previous example that had an excess of the reagents.

It is clear that there were important differences between the FTIR spectra for the two types of liquid residue. First, in the second spectrum (FIG. 6 b), there seemed to be a larger amount of saturated carbon groups with signals around 3000 cm$^{-1}$, and a considerably smaller amount of OH groups as evidenced by the shift in the signal away from the 3500 cm$^{-1}$ (peak 1 in FIG. 6 b). In addition, the signal around 2350 cm$^{-1}$ (peak 2 in FIG. 6 b) indicated that the phosphor groups in the second solution, produced with less than the stoichiometric quantities of the reagents, were more prominent than in the first solution produced with excess reagents. This supports the claim that there were fewer OH groups present in the second solutions. Secondly, the C=O signal shifted to higher frequencies in the second solutions (peak 3 in FIG. 6 b). This is an indication that the carboxylic groups were not as conjugated as those in the samples with excess reagents, so that the C=O groups probably came from glutaraldehyde rather than the Kevlar®. Overall, those differences indicate that reducing the amount of PA/GA reagents led to a decreased extent of hydrolysis, with correspondingly fewer OH groups being formed and larger amounts of the unreacted glutaraldehyde remaining (as observed in FIG. 6 b). This conclusion is also supported by the proposed reaction mechanism given in the previous section (FIGS. 2 and 3).

2.3 Tailored Mechanical Properties of Aramid Nanofiber Networks with PA/GA Treatment Prepared by Vacuum-Assisted Filtration Aramid nanofiber networks were treated with different amounts of PA/GA reagents and were characterized by uniaxial tensile testing at a strain rate of 0.005/s. Five samples were compared, each with different amounts of PA, which controlled the extent of hydrolysis, and different amounts of GA, which controlled the extent of hydrolyzed chain polymerization. A sample prepared with an excess amount of both reagents is expected to have a structure similar to that shown in FIG. 5. Similarly, a sample prepared with less than the stoichiometric amount of the reagents is expected to have a structure similar to that shown in FIG. 4 (b.2). Table 1 lists the amounts of PA and GA for every 100 mg Kevlar dispersed in 100 mL DMSO used to prepare each of the five samples. The stress-strain curves (FIG. 7) illustrate the characteristic stiffness and strength of each of these five samples. The samples prepared with less PA (A-C) and, hence, with a lower extent of hydrolysis and with more of the stiff aramid backbone molecules preserved, were stiffer than those that underwent more hydrolysis (D and E). Within each of these groups, the samples prepared with more GA (B and D) were stiffer than their counterparts (C and E) that underwent less polymerization of hydrolyzed chains.

When the hydrolysis extent was low and GA content was high (Samples A and B), the GA polymerization served as a crosslinking purpose to enhance the interactions between the nanofibers. The ideal mechanism would limit the hydrolysis extent to nanofiber surfaces, which generates reactive functional groups for GA crosslinking, but without hampering the stiffness of the aramid nanofibers. This mechanism would result in improved stiffness and yield strength by having covalent bonding between the nanofibers instead of hydrogen bonding in nanofiber networks with no treatment.

TABLE 1

The phosphoric acid and glutaraldehyde contents used in the Aramid nanofiber networks.

| For 100 mg of Kevlar ® in 100 mL DMSO | PA (mL) | GA (mL) |
|---|---|---|
| Sample A | 0.25 | 1.5 |
| Sample B | 1 | 1.5 |
| Sample C | 1 | 1 |
| Sample D | 2.5 | 3.5 |
| Sample E | 2.5 | 3 |

The five nanofiber networks of Table 1 and FIG. 7 became darker with increased reaction content. Sample A and B had the least amount of PA and GA contents, and therefore they had colors closest to that of the aramid nanofiber network with no treatment.

Dynamic Mechanical Analysis

Results of dynamic mechanical analysis (DMA) at a strain rate of 1 Hz on the nanofiber networks are shown in FIG. 8. The storage moduli of the samples followed the same trend as that shown in the uniaxial tensile tests: Sample A had the highest storage modulus over a large temperature span and Sample E had the lowest. The transition indicated by the peak of loss tangent at around −50° C. flattened from Sample E to Sample A, possibly caused by the higher preservation of the stiff aramid backbone molecules owing to a lower degree of hydrolysis.

At a given temperature, the storage modulus increased with a reduced quantity of PA or with an increased quantity of GA, as also indicated by the uniaxial tension tests. The transition indicated by the peak in the loss-tangent curve at around −50° C. flattened with increasing amount of aramid backbone molecules preserved from lower extent of hydrolysis.

2.4 TEM and TGA Characterizations Probing Network Morphology Changes by PA/GA Treatment The effect of phosphoric acid and glutaraldehyde on changing the morphology of aramid nanofiber networks was proposed and probed by FTIR as well as mechanical testing. Here we reveal morphology changes from PA/GA treatment using TEM and compare morphologies of Kevlar dispersed in DMSO 1) with no treatment, 2) hydrolyzed by PA with different extents and 3) crosslinked by different amount of GA after the hydrolysis. The aramid nanofibers with no treatment consist of randomly orientated nanofibers forming a network. The morphologies of Sample A and B after each treatment step are shown in FIG. 9 (c to f). FIG. 9 (c) shows that limited amount of PA, i.e. 0.25 mL 85 wt % PA for 100 mg Kevlar, as in Sample A, swelled the nanofibers and resulted in slightly larger nanofiber diameters in FIG. 9 (c and d). The PA-treated, reactive form of aramid nanofibers was crosslinked by GA, as shown in FIG. 9 (d), and yielded higher network stiffness and strength (FIG. 7), as well as higher thermal resistance. FIG. 9 (e) shows that when large amount of PA was used as 1 mL PA was added to 100 mg Kevlar for Sample B and C, the nanofibers turned into nanosheets. These nanosheets were formed not only owing to the smaller nanofiber length but also very likely by the collapse of smaller diameter nanofibers due to extensive hydrolysis. Although these nanosheets have higher affinity for bonding with other substances and are useful reactive aramid nanoscale building blocks, they are discontinuous and thus hamper the network stiffness compared to long, continuous nanofibers with no treatment. This is what caused low stiffness in Sample D and E with even higher amount of PA used. FIG. 9 (f) shows that after 1.5 mL 50 wt % GA was used, a continuous network was successfully restored from nanosheets, as discussed previously in FIGS.

5 and 4 (*b*.2). Although some of the nanosheets remained as defects from incomplete GA condensation reaction (FIGS. 2 and 3), the stiffness of the network, i.e. the stiffness of Sample B, was restored (FIG. 7).

Thermogravimetric Analysis

Thermogravimetric analysis (TGA) yielded additional information about the structural changes in the aramid nanofiber networks. Between 5 and 20 wt % of the PA/GA-treated samples decomposed at ~150° C. This decomposition came from the easily combustible aramid molecules from hydrolysis with amide and carboxylic acid termination (FIG. 2), or from the dangling aliphatic chains from incomplete GA condensation (FIGS. 3 and 9 (*c, d*)). They were the defects introduced by the treatment. On the other hand, the PA/GA-treated networks showed significant improvements in high temperature resistance over those of the untreated one; for example, approximately 65 wt % of Sample A remained at the end of a temperature ramp test from 25° C. to 900° C., while the sample with no treatment decomposed completely at ~800° C. with the same sample weight, heating rate and air purge rate. Although the invention is not to be limited by theory, the higher thermal resistance of the PA/GA-treated samples comes perhaps from aliphatic chains of GA with both ends connected to aramid backbone molecules (FIGS. 5 and 4*b*.2). In this model, the crosslinked aramid networks are harder to decompose owing to a stronger interaction between the nanofibers.

It was observed that samples D and E had decreased thermal resistances compared to samples A to C. This is believed to be a result of a higher degree of hydrolysis, which resulted in higher content of easily decomposable amide and carboxylic acid terminated aramid molecules (FIGS. 2, 3 and 9 (*c, d*)). In addition, given the same amount of hydrolysis, since sample B had a larger GA content than sample C and sample D a larger GA content than sample E, samples B and D had higher thermal stability than sample C and E respectively owing to a higher extent of GA condensation.

Example 3

Automation of The Layer-By-Layer Assembly with Non-Water-Soluble Material

An automated LBL assembly process has been designed and implemented, which involves the modification of an original LBL machine and addition of a robot. The difficulties associated with the automation of Kevlar based nanocomposite LBL process were identified and solved by the specially designed robot.

3.1 The traditional LBL fabrication process

Layer-by-layer assembly for water-soluble materials such as polyurethane and montmorillonite has been defined as a process by which oppositely charged macromolecules are deposited. [1-5] The procedure of making a monolayer is through immersing a piece of substrate into a polymer or nanofiller solution for several minutes, followed by rinsing in de-ionized water and drying by compressed air. By repeating the same steps and alternating the solution during immersion, different layers of materials can be deposited layer by layer.

3.2 Dissolution of Kevlar Fibers in Dimethyl Sulfoxide

Dispersion of nano-scale Kevlar fibers was achieved via a reaction of potassium hydroxide (KOH) with Kevlar in a dimethyl sulfoxide (DMSO) solution. 1.5 g of Kevlar 69 fibers (from Thread Exchange Inc., right twist) were soaked in 1-methyl-2-pyrrolidinone (NMP) (anhydrous, 99.5%, Sigma-Aldrich) and sonicated for two days to swell the Kevlar fibers and provide dissolution.] After sonication, the Kevlar fibers were washed by de-ionized water and dried completely. The NMP-sonicated Kevlar fibers were then mixed with 1.5 g KOH (99.9% Semiconductor Grade, Sigma Aldrich) in 0.5 L of DMSO (99.9%, Sigma Aldrich). The mixture was stirred vigorously at room temperature for seven to nine days until the solution turned viscous and dark red, indicating the Kevlar fibers were fully dissolved. Similar preparation of Kevlar nanofibers without NMP sonication was previously shown to have diameters of 3 to 30 nm and lengths on the order of 10 μm.

3.3 LBL Assembly of Kevlar Nanofiber Network

The Kevlar LBL films were made as follows: (i) A glass slide is coated with poly (diallyldimethylamonium chloride) (PDDA) by dipping in PDDA solution for one minute. This first layer of PDDA is necessary for the initiation of Kevlar layer growth since the positively charged PDDA provides electrostatic attraction for the negatively charged nanofibers. (ii) This slide is then immersed in Kevlar/DMSO solution (of section 2.2) for two minutes, followed by rinsing in deionized water for one minute to get rid of loosely attached nanofibers. This allows deposition of a monolayer of Kevlar nanofibers on the substrates. Before another monolayer dispersion of Kevlar nanofibers, the substrate is dried by compressed air. A Kevlar nanofiber film is ready after deposition of hundreds of layers. The successive dispersion of the nanofibers is achieved by hydrogen bonding and benzene ring interaction.

3.4 The Difficulties Associated with Kevlar LBL Process

The difficulties of the Kevlar LBL process stem from the water-sensitivity of Kevlar/DMSO solution. The Kevlar/DMSO solution (described in section 3.2) is sensitive to humidity. With the addition of a small amount of water, precipitation of Kevlar will be formed and deteriorate the solution, which make it require a humidity-free environment for the LBL process to ensure the quality of the resulting nanocomposites.

3.5 The NanoStrata Machine for Tradition LBL Fabrication

The automation of the traditional LBL fabrication process is achieved via a machine, StratoSequence VI, from NanoStrata Inc (Tallahassee, Fla.). It provides automation of the LBL process through a rotating circular platform on which a maximum number of eight beakers can be placed. The platform is lowered and lifted each time with a rotation of one-eighth of a circle. A holder of glass substrates is fixed on top of one of the beaker position, indicated as Substrate Dipping Station, such that once the platform lifts up, the substrates on the holder will be inside the beaker. With the rotation, each beaker will be lifted to have the substrates dip inside. On the other side of the platform, a water cycling station can replace the rinsing water for the beakers if needed. There is a tube with compressed air blowing at the substrates located at the substrate dipping station for substrate drying as well.

In the NanoStrata machine, a circular platform is lifted and lowered along with rotation each time to send different beakers to a substrate dipping station. A water cycling station with two straws can suck up the dirty rinsing water and replace with clean water.

As the platform is lifted, a beaker is lifted to enclose the substrates. With the solution inside the beaker, this serves as the dipping stage of LBL. The water cycling station will replace the rinsing water in the beaker at the same time if necessary. Right: Once the dipping is over, the platform lowers and lifts again with the amount of the rotation to shift one beaker, such that two beakers on the platform both move one step forward in the figure. An empty beaker position serves as a drying stage. Compressed air comes out a nozzle and a holder spins to ensure a uniform drying of the substrates in this case.

3.6 The Lid-lifting Robot for New LBL Fabrication

Since the challenge to automate Kevlar LBL fabrication lies in the sensitivity of Kevlar/DMSO solution to water, the beaker containing Kevlar/DMSO has to be water sealed when not in use. The idea is to modify the StratoSequence VI so that a beaker containing Kevlar/DMSO can be sealed shut and can be opened once per rotation to enable the dipping of the glass substrates into the solution. The design of such a mechanism thus came up that can raise a lid before the dipping station and lower the lid as soon as that step is complete.

The lifting mechanism uses a Hitec HS-225BB High Performance Mini Servo with a maximum angular spee of 7.5 radians/sec and torque of 3.9 kg-cm. The arm and lid can be made primarily of aluminum, with apolyurethane foam creating a seal around the beaker's rim.

Sensor input is provided by a Devantech Magnetic Compass Module CMPS03with 0.1 degree of resolution and 3-4 degrees of accuracy.

An exemplary processor is an Arduino Duemilanove Microcontroller Module, programmable via USB, with 14 digital I/O pins and 6 analog input pin.

Algorithm Overview:

When the batteries are plugged in, the robot will turn on and proceed to lift its arm to the vertical (up) position. It will then wait for thirty seconds. This time is built in to allow the nanoStrata machine to be turned on and for the first dip to begin. After the thirty seconds are up, the robot's most important function begins to run. This function senses the orientation/rotation of the nanoStrata table (and thus, also the robot).

The robot's compass sensor returns an integer between 0 and 359, inclusive, indicative of the direction the robot is facing. Indeed, this number alone could be used to determine when the arm should be up and when it should be down, but this simple method has some flaws. Firstly, if the nanoStrata machine is moved, let's say, and in the process is rotated, the robot will need to be reprogrammed in order to reestablish which orientations require action by the robot. Another flaw of this method is that the compass sensor, like any compass, is affected by ferrous materials. If there is a screwdriver or watch or some other common ferrous material in close proximity to the compass sensor, the directional values generated by the sensor could be skewed.

The robot's algorithm, then, does not rely directly on a directional value, but instead, it relies on sensing for significant rotations and counting the rotations to determine what position the robot is currently at. This method requires that the robot always start at a certain position, specifically, it requires that the robot must start facing the dipping station (the robot's beaker will be the first beaker that the substrates will be submerged into). The rotation sensing function, called rotationCheck, reads in the directional value from the compass sensor once every 0.5 seconds. An array of the last twelve readings is maintained in order to compare the current facing (an average of the two most recent readings) and the facing from five second prior (an average of the two last readings saved within the array). If the robot's facing has changed a significant amount over the past five seconds (12 degrees or more), the function ends, returning the value false. If the function does not return a value for an extended period of time (about 65 minutes), the function will stop and the robot's lid will open.

After the table and robot rotate from this position, the lid will close onto the beaker and seal it shut. Each subsequent rotation will be monitored by the robot's program until it knows that the robot is facing the station directly before the dipping station (the "pre-dip station"). At this point, the program will simply wait a predetermined (pre-programmed) time. This length of time should be equivalent to or slightly less than the pre-dip station duration. This means that if the pre-dip station's time duration is changed, the program must also be changed.

Once that amount of time has passed, the lid will lift off the beaker and the robot will immediately begin to sense for rotation. After one rotation, it will be at the dipping station. After one more rotation, the lid will be lowered (to the closed position) and the process will begin to repeat.

Source Code:

The Arduino Duemilanove Microcontroller can be programmed using the Arduino programming language (based on C/C++). For more information, go to www.arduino.cc/en/Reference.

The flow chart in FIG. 10 illustrates the algorithm.

Example 4

Hierarchical Films

In this example, (NMP-Kevlar/PA/GA) refers to a Kevlar microfiber pre-swollen in NMP, suspended in DMSO/KOH to make a nanofiber suspension, and then treated with PA/GA while in LBL process. (PAA/PU/PAA) refers to a LBL trilayer of Poly (acrylic acid)/Polyurethane/Poly (acrylic acid).

(NMP-Kevlar/PA/GA):

The slide was immersed in a Kevlar/DMSO solution (Kevlar was pre-soaked in NMP for 2 days and sonicated) for two minutes, followed by immersion in 10 wt % PA in de-ionized water and 10 wt % GA in de-ionized water for one minute respectively. This process deposited a monolayer of PA/GA treated Kevlar nanofibers on the substrate. The slide was rinsed in de-ionized water for one minute to remove loosely attached nanofibers as well as excess PA and GA, and then dried by compressed air. The process was repeated beginning with dipping in the Kevlar/DMSO solution until the desired film thickness is achieved.

(NMP-Kevlar/PA/GA) (PAA/PU/PAA):

This hard (NMP-Kevlar/PA/GA) phase used as building blocks assembled in a soft matrix to create a hierarchical structure which could provide improvements in toughness. Polyurethane (PU) and poly (acrylic acid) (PAA) LBL films exhibit ductile behavior. Thus, PU/PAA was chosen to be the soft phase material bonding with Kevlar/PA/GA in order to achieve a hierarchical structure that helps to deflect crack propagation in the nanocomposite and prevent catastrophic failure of the brittle phase made of Kevlar/PA/GA. One hierarchical film was made in this way: after building up 25 layers of Kevlar/PA/GA to make an LBL film about 2.2 μm thick, that film was sequentially dipped in PU, PAA and PU solutions to get a thin layer of PU/PAA/PU on one surface of the Kevlar/PA/GA film. Four of these composite films were hot-pressed under pressure of about 30 MPa at 230° F. for 30 minutes to bond the films.

Example 5

Films with Gold Nanoparticles 5.1 Synthesis

Three families of aramid nanostructured films were prepared to study the effect of using different amounts of phosphoric acid (PA), citrate and citrate+gold nanoparticles (AuNPs) on the mechanical properties. They were synthesized by reacting a Kevlar™/potassium hydroxide (KOH)/dimethyl sulfoxide (DMSO) solution of ANFs with 1)

various amounts of PA, followed by adding a fixed amount of a citrate/AuNP solution; 2) a fixed amount of PA, followed by two amounts of citrate powder; 3) a fixed amount of PA, followed by adding various amounts of the citrate/AuNP solution. Also, an ANF network with no treatment (the ANF filtration film) was made as a comparison by adding water to the ANF solution. After chemical treatment, films were fabricated from the solution by vacuum-assisted filtration to obtain continuous and homogeneous structures. The twelve different conditions used to prepare the three families and the ANF networks are shown in Table 2. The AuNPs used to prepare these samples had diameters of 13 nm, controlled by the weight ratio of citrate to AuNPs during the citrate/AuNP solution preparation, which was ~3.7 for 13 nm particles [Frens 1973].

It should be noted that it was not possible to form a continuous and homogeneous film of sufficient strength for testing with ANF solutions that had been exposed to PA but not to citrate or citrate+AuNPs, or from solutions exposed to citrate and AuNPs but not to PA. A sample made by adding gold chloride, a precursor to make the citrate/AuNP solution, in the Kevlar/KOH/DMSO solution and exposed to the same synthesis conditions also resulted in a very brittle film without sufficient strength for mechanical testing.

In the experiments recorded in Table 2, an ANF network with no treatment was made as a comparison. A parameter study of each constituent was made by varying their quantity to understand their effect on the resulting mechanical properties. Continuous and homogenous networks were successfully obtained from each treatment, except for the samples made with just PA ("No Citrate/Gold") or just Citrate ("No PA"). The uncertainty of the stiffness is ~5%.

TABLE 2

Aramid nanostructured networks assembled by vacuum-assisted filtration with varied PA, citrate and citrate + AuNP (13 nm diameter) contents used in synthesis

| For 40 mg Kevlar Sample Name | Phosphoric Acid (mL) | Citrate (mg) | Gold (13 nm) (mg) | Stiffness (GPa) |
|---|---|---|---|---|
| No Treatment | 0 | 0 | 0 | 7.1 |
| PA-0.1 | 0.1 | 13 | 3.6 | 7.8 |
| PA-0.2 | 0.2 | 13 | 3.6 | 9.0 |
| PA-0.3 | 0.3 | 13 | 3.6 | 9.3 |
| PA-0.4 | 0.4 | 13 | 3.6 | 8.4 |
| PA-0.5 | 0.5 | 13 | 3.6 | 6.0 |
| Cit-4 | 0.3 | 4 | 0 | 5.0 |
| Cit-13 | 0.3 | 13 | 0 | 5.8 |
| Au-Cit-1 | 0.3 | 4 | 1 | 6.2 |
| Au-Cit-3.6 | 0.3 | 13 | 3.6 | 9.3 |
| Au-Cit-7.2 | 0.3 | 26 | 7.2 | 9.9 |
| Au-Cit-3.6-0.5 | 0.5 | 13 | 3.6 | 6.0 |
| Au-Cit-7.2-0.5 | 0.5 | 26 | 7.2 | 6.4 |
| No PA | 0 | 13 | 3.6 | — |
| No Citrate/Gold | 0.3 | 0 | 0 | — |

Table 3 shows another family of aramid nanostructured films with larger AuNP size (60 nm diameter), to study the mechanisms of how changing AuNP size affects the mechanical properties. Two samples were prepared by reacting the Kevlar/KOH/DMSO solution with a fixed amount of PA, followed by 1) the addition of a citrate/AuNP (60 nm) solution or 2) the addition of 9 mg citrate power followed by the citrate/AuNP (60 nm) solution. The citrate/AuNP solution with 60 nm diameter particles was prepared using a citrate-AuNP ratio of ~1.1, compared to ~3.7 for a 13 nm diameter solution [Frens 1973]. This means that additional citrate needed to be added, if a good comparison was to be made between the two samples with different particle size but the same amounts of PA, citrate and AuNPs. Sample Au(60)-Cit-Extra was made for this comparison, by adding an extra 9 mg citrate prior to the addition of the citrate/AuNP (60 nm) solution. For a valid comparison between samples with two AuNP sizes, Sample Au(60)-Cit-Extra was made by having extra 9 mg citrate, to have equal amounts of PA, citrate and AuNPs as those of Sample Au-Cit-3.6 with 13 nm AuNPs. The only difference between two samples was thus only the AuNP sizes.

TABLE 3

Aramid nanostructured networks assembled by vacuum-assisted filtration with AuNPs of 60 nm diameter as a comparison with the sample with 13 nm AuNPs

| Different Au Size (for 40 mg Kevlar) Sample | Phosphoric Acid (mL) | Citrate (mg) | Gold (mg) | Diameter (nm) | Stiffness (GPa) |
|---|---|---|---|---|---|
| Au-Cit-3.6 | 0.3 | 13 | 3.6 | 13 | 9.3 |
| Au(60)-Cit | 0.3 | 4 | 3.6 | 60 | 7.4 |
| Au(60)-Cit-Extra | 0.3 | 4 + 9 | 3.6 | 60 | 7.6 |

5.2 The Effect of PA Hydrolysis: Functionalization of ANFs

Phosphoric acid is a proven method to create more functional groups on aramid molecules through hydrolysis reaction, which improves the surface bonding of ANFs with other constituents. However, extensive hydrolysis induced by PA changes the morphology of the ANFs into nanosheets, which reduces the network stiffness, as discussed in Chapter 5. The mechanical properties of the PA/Citrate+AuNP treated films were also tuned by the amount of PA used during synthesis. As characterized by room-temperature uniaxial tensile testing at a strain rate of 0.005/s, initially increased hydrolysis (more PA) tends to result in a stiffer material from 0.1 mL to 0.3 mL PA for 40 mg Kevlar, while further increasing PA hydrolysis tends to result in a more compliant material, from 0.3 mL to 0.5 mL. A finite level of hydrolysis is required to provide active sites for the reaction with the citrate and gold, as the "No PA" sample does not form a continuous network. Citrate and AuNPs are not able to form bonds with the inert aramid molecules, unless water is used as in the "No Treatment" case, which re-protonates aramid macromolecules so that they form a film through hydrogen bonding.

In particular, compared to the untreated material, a limited amount of PA hydrolysis followed by reaction with citrate and gold (Samples PA-0.1, 0.2, 0.3 and 0.4) produces networks that are stiffer. However, increased levels of hydrolysis result in more compliant networks (Samples PA-0.3 to 0.5), as over hydrolysis broke down aramid molecules and changed the morphology of ANFs to nanosheets. Sample PA-0.3 (i.e. Au-Cit-3.6) had the highest stiffness and strength, as PA functionalized enough ANFs for condensation reactions with citrate, compared to Samples PA-0.1 and 0.2, but didn't over-hydrolyze ANFs to reduce the network stiffness, compared to Samples PA-0.4 and 0.5.

5.3 The Effect of Citrate Condensation: Crosslinking of Hydrolyzed ANFs

The mechanical properties of the PA/citrate+AuNP treated films were also tuned by the amount of citrate used during synthesis. Two samples were synthesized with the addition of citrate powder after PA hydrolysis (i.e. without AuNPs) to indicate its effect. For a fixed level of hydrolysis, a higher citrate level promotes the stiffness, yield strength and ultimate strength of the networks (Samples Cit-4 and Cit-13). This increase is provided by a higher level of crosslinking among the hydrolyzed aramid nanostructures, leading to a stronger interaction among them. More information on how crosslinking of hydrolyzed aramid nanostructures affects the network mechanical properties is given in the companion work, as discussed in chapter 5, where glutaraldehyde was used as a crosslinker.

5.4 The Effect of AuNPs: Reinforcement in Aramid Networks

Experimental data show that the addition of gold further enhances the mechanical properties of the networks. For a fixed level of PA hydrolysis and citrate crosslinking, additional AuNPs in Sample Au-Cit-3.6 (i.e. PA-0.3) based on Sample Cit-13, and similarly in Sample Au-Cit-1 based on Sample Cit-4, reinforce the networks and provide higher stiffness, yield strength and ultimate strength. The same reinforcement effect is also observed for using larger diameter AuNPs (60 nm).

Data provide another indication that AuNPs serve as a reinforcement phase to promote the mechanical properties of the networks. Although Samples PA-0.4 (with 0.4 mL PA) and PA-0.5 (with 0.5 mL PA) both had higher levels of PA hydrolysis than Sample Cit-13 (with 0.3 mL PA), and—as discussed above—that over-hydrolysis hampers the network stiffness and strength, the two samples with more PA still have higher stiffness and yield strength owing to the reinforcement effect from the AuNPs.

Citrate and AuNPs both contribute to promote the stiffness, yield strength and ultimate strength of the PA/citrate-AuNP-treated aramid networks after a proper amount of hydrolysis to functionalize ANFs. This hardening effect saturates, however, by adding excess citrate/AuNP solution. The mechanical properties of Samples Au-Cit-3.6 (i.e. PA-0.3) and Au-Cit-7.2, both with the same level of PA hydrolysis but two levels of citrates and AuNPs, were almost identical. This indicates that excess citrate/AuNPs in Sample Au-Cit-7.2 were not able to bond with the hydrolyzed aramid nanostructures to further increase the network stiffness and strength. For samples with a higher amount of hydrolysis (0.5 mL), Sample Au-Cit-3.6-0.5 (i.e. PA-0.5) is also saturated, as doubling the amount of citrate/AuNPs in Sample Au-Cit-7.2-0.5 yielded almost identical mechanical properties as well. If the hydrolyzed sites are not saturated, as for Sample Au-Cit-1, the network is stiffened by the addition of the citrate/AuNP solution (Sample Au-Cit-3.6) owing to the crosslinking effect from citrate.

Data show a comparison between the aramid/citrate+AuNP samples with different AuNP size. For a fixed amount of gold, a larger particle size means a smaller surface area to volume ratio; thus there is less total surface area available for bonding. The size of the AuNPs thus affects the degree of chemical attachment of the gold to the hydrolyzed aramid chains. At small strains, the amount of total particle surface area dominates the properties, as Sample Au-Cit-3.6 with 13 nm diameter particles, i.e. 4.6 times of total surface area for bonding compared to that of samples with 60 nm AuNPs, has a higher stiffness than samples with 60 nm diameter AuNPs. The stiffness of samples with 60 nm AuNPs is closer to that of samples with only citrate and no gold, as the total surface area of AuNPs in them is too small to yield a prominent effect. A higher total surface area of AuNPs provides more interaction between AuNPs and the aramid matrix, leading to better load transfer, which promotes stiffness and strength. At large strains, the amounts of AuNPs and citrate (i.e. the magnitude of their quantities) in the samples dominate their mechanical properties. The stress-strain curves of Samples Au-Cit-3.6 and Au(60)-Cit-Extra start to converge, as they have the same amount of AuNPs and citrate, and for those samples with different amount of citrate or AuNPs, their stress-strain curves deviate at larger strains.

What is claimed is:

1. A transparent film comprising a layer-by-layer assembled composite comprising a plurality of deposited layers, said layers comprising hydrolyzed aramid nanofibers and a crosslinker,
   wherein said aramid nanofibers have diameters of 3 to 50 nm and lengths of 0.1-10 micrometers, and wherein said composite is 10 to 2,000 deposited layers.

2. The film of claim 1, wherein said composite is 10 to 1,000 deposited layers.

3. The film of claim 1, wherein said composite is 100 to 500 deposited layers.

4. A hierarchical transparent film comprising:
   at least one layer comprising hydrolyzed aramid nanofibers and a crosslinker, wherein the aramid nanofibers have diameters of 3 to 50 nm and lengths of 0.1-10 micrometers; and
   at least one layer of a polymeric material, wherein said polymeric material comprises polyurethane or polyacrylic acid.

5. A transparent film comprising a layer-by-layer assembled composite comprising a plurality of deposited layers, said layers comprising hydrolyzed aramid nanofibers and a crosslinker,
   wherein said aramid nanofibers have diameters of 3 to 50 nm and lengths of 0.1-10 mmicrometers, wherein said crosslinker is glutaraldehyde.

* * * * *